US012781826B2

(12) United States Patent
Sobejano Landívar

(10) Patent No.: US 12,781,826 B2
(45) Date of Patent: Nov. 3, 2026

(54) SOLENOID VALVE FOR SHOCK ABSORBER WITH HYDRAULIC LOAD REGULATION

(71) Applicant: Kyb Europe GmbH, Sucursal En Navarra, Ororbia (ES)

(72) Inventor: Javier Sobejano Landívar, Ororbia (ES)

(73) Assignee: Kyb Europe GmbH, Sucursal En Navarra, Ororbia (ES)

( * ) Notice: Subject to any disclaimer, the term of this patent is extended or adjusted under 35 U.S.C. 154(b) by 357 days.

(21) Appl. No.: 18/583,179

(22) Filed: Feb. 21, 2024

(65) Prior Publication Data

US 2024/0288046 A1 Aug. 29, 2024

(30) Foreign Application Priority Data

Feb. 27, 2023 (ES) .................................. 202330168

(51) Int. Cl.
*F16F 9/348* (2006.01)
*F16F 9/18* (2006.01)
(Continued)

(52) U.S. Cl.
CPC .............. *F16F 9/348* (2013.01); *F16F 9/185* (2013.01); *F16F 9/369* (2013.01); *F16F 9/50* (2013.01);
(Continued)

(58) Field of Classification Search
CPC .. F16F 9/348; F16F 9/185; F16F 9/369; F16F 9/50; F16F 2222/12; F16F 2230/0052;
(Continued)

(56) References Cited

U.S. PATENT DOCUMENTS 3,570,635 A * 3/1971 Takagi ...................... F16F 9/50 188/196 R
5,085,300 A * 2/1992 Kato ...................... F16F 9/348 188/280
(Continued)

FOREIGN PATENT DOCUMENTS

ES 2046898 T3 2/1994
GB 458311 12/1936
(Continued)

*Primary Examiner* — Vishal R Sahni
(74) *Attorney, Agent, or Firm* — The Webb Law Firm

(57) ABSTRACT

A solenoid valve that can be adjusted axially, and hermetically, to a first end of a body of a shock absorber in order to be able to regulate the hydraulic load of the shock absorber as well as guide the movement of the rod in a longitudinal direction. The solenoid valve includes a movable part that can be moved between an open fluid flow position and another closed fluid flow position, a regulating chamber that generates a pressure to move said movable part towards the opening and an elastic element that generates a closing force. Likewise, the solenoid valve also includes electronic means to exert a force on the movable part, to move it in the direction of movement, preferably by means of a magnetic load. The invention also includes a shock absorber with hydraulic load regulation that comprises a solenoid valve, like the one mentioned, adjusted hermetically to a first end of the body of said shock absorber.

26 Claims, 14 Drawing Sheets

(51) Int. Cl.

| | |
|---|---|
| ***F16F 9/36*** | (2006.01) |
| ***F16F 9/50*** | (2006.01) |
| ***F16K 15/18*** | (2006.01) |
| ***F16K 31/06*** | (2006.01) |
| *B60G 13/08* | (2006.01) |
| *B60G 17/08* | (2006.01) |

(52) U.S. Cl.
CPC ........ *F16K 15/182* (2021.08); *F16K 31/0655* (2013.01); *B60G 13/08* (2013.01); *B60G 17/08* (2013.01); *B60G 2202/24* (2013.01); *B60G 2204/62* (2013.01); *B60G 2206/41* (2013.01); *B60G 2500/104* (2013.01); *B60G 2500/114* (2013.01); *B60G 2600/182* (2013.01); *B60G 2800/162* (2013.01); *B60G 2800/916* (2013.01); *F16F 2222/12* (2013.01); *F16F 2230/0052* (2013.01); *F16F 2230/30* (2013.01)

(58) Field of Classification Search
CPC ............... F16F 2230/30; F16K 15/182; F16K 31/0655; B60G 13/08; B60G 17/08; B60G 2202/24; B60G 2204/62; B60G 2206/41; B60G 2500/104; B60G 2500/114; B60G 2600/182; B60G 2800/162; B60G 2800/916
See application file for complete search history.

(56) References Cited

U.S. PATENT DOCUMENTS

| | | | | |
|---|---|---|---|---|
| 5,207,300 | A * | 5/1993 | Engel | B60G 17/08 188/266.2 |
| 5,318,157 | A | 6/1994 | Kempf | |
| 8,997,952 | B2 * | 4/2015 | Goetz | F16F 9/464 188/282.7 |
| 9,731,575 | B2 * | 8/2017 | Chikuma | F16F 9/468 |
| 2009/0294232 | A1 * | 12/2009 | Ashiba | F16F 9/348 188/322.15 |
| 2014/0239602 | A1 * | 8/2014 | Blankenship | F16F 9/3207 280/5.515 |
| 2014/0262654 | A1 | 9/2014 | Roessle et al. | |
| 2020/0003272 | A1 * | 1/2020 | Yamashita | F16F 9/512 |
| 2022/0128115 | A1 | 4/2022 | Mori et al. | |
| 2023/0220901 | A1 * | 7/2023 | Bähr | F16K 31/0675 188/322.13 |

FOREIGN PATENT DOCUMENTS

| | | | |
|---|---|---|---|
| JP | S58211043 | A | 12/1983 |
| JP | H0257493 | A | 2/1990 |
| JP | H0626546 | A | 2/1994 |
| WO | 2018112375 | A1 | 6/2018 |

* cited by examiner

SOLENOID VALVE FOR SHOCK ABSORBER WITH HYDRAULIC LOAD REGULATION

CROSS-REFERENCE TO RELATED APPLICATION

This application claims priority to Spanish Patent Application No. P202330168 filed Feb. 27, 2023, the disclosure of which is hereby incorporated by reference in its entirety.

BACKGROUND OF THE INVENTION

Field of the Invention

The object of the present invention consists of a solenoid valve for shock absorbers, specially configured to regulate the damping load in a hydraulic device in such a way that said load is determined by a control electric current supplied to the solenoid valve and by the extension and/or compression speeds of the suspension.

The invention falls within the industrial sector that comprises hydraulic devices with variable damping load and, in particular, in the field of variable load shock absorbers specially designed for vehicles.

Description of Related Art

The shock absorber is a device intended to mitigate oscillations in a suspension such as those produced in an automobile when it moves over a rough or steep surface, until it recovers its equilibrium position by dissipating kinetic energy.

The shock absorber has a decisive influence on both the stability and comfort of automobiles. In fact, the adjustment of the hydraulic load that it generates represents a compromise between both stability and comfort.

- Stability: the vehicle is dynamically controlled at low extension and/or compression speeds of the suspension. In this operating regimen, a high level of damping, i.e., high hydraulic loads, is required.
- Comfort: it is mainly related to medium and high extension and/or compression speeds of the suspension. Thus, a higher degree of comfort in the vehicle is subject to a reduced level of damping (i.e., low hydraulic loads), which makes it possible to decouple the movement of the wheels from the oscillations of the chassis.

Therefore, it is desirable for the shock absorber to be able to adjust the load level thereof to the different characteristics of the oscillations it must mitigate:

- Adaptation of the damping depending on the oscillation speed of the suspension: shock absorbers on the market normally have an internal configuration configured to generate a higher damping coefficient for low speeds than for medium and high speeds. The function that relates the load of a shock absorber and the oscillation speed thereof is the main features of the same and the curve on which it acts in order to optimise the compromise between stability and comfort.
- Adaptation of the damping depending on the control current: there are shock absorbers on the market that are able to adapt the hydraulic load they exert, both in extension and in compression, depending on a control current supplied from a control device such as a switchboard. This control determines, based on a series of parameters, the optimal hydraulic load on the shock absorber at all times and sends the appropriate setpoint current to the shock absorber. In this way, the compromise between comfort and stability of the vehicle is significantly improved, being able to offer both comfortable operation and a high hydraulic load when the vehicle's stability situation requires it.

Electronically controlled shock absorbers that are on the market today usually consist of a solenoid valve actuated by a solenoid or coil. The usual arrangement of said valve is on one side of the shock absorber. However, this arrangement complicates the manufacture of the housing of the shock absorber, as well as its internal elements to circulate the oil to said valve.

With the aim of simplifying the structure of the shock absorber, there are designs that seek to include the solenoid valve within its body, without the need to make a lateral connection. Thus, designs arise that include the actuator in the very piston of the shock absorber. This usually requires a power cable to run through the rod, which creates the need for said rod to be hollow (weakening the structural capacity thereof). Furthermore, the wired connection of the solenoid valve through the rod usually makes it difficult to assemble the shock absorber in the rest of the components of the machine in which it can be installed.

Other designs, such as the one developed in this invention, seek to solve the same problem by including the solenoid valve in the area of the guide of the shock absorber, thereby eliminating the need to run the cable through the rod, obtaining more usable space for the inclusion of the necessary construction elements.

To have complete shock absorber operation, being able to regulate its load both in extension and in compression is desirable. Thus, if only one solenoid valve is available for this purpose, the shock absorber can comprise a valve adjustment, both in the piston and in the valve support, so that the oil is forced to flow through the solenoid valve, when the shock absorber is performing both extension and compression movements.

The solenoid valve makes it possible to hinder said flow to a greater or lesser extent, successfully regulating the hydraulic load in the aforementioned extension and compression strokes.

After passing through the solenoid valve, the fluid (normally oil) from the shock absorber passes to a reserve chamber, similar to the operation of any "two-tube" shock absorber, whether electronically controlled or not.

The construction of the solenoid valve may vary in each design and determines the characteristics of the hydraulic forces that the shock absorber is capable of exerting.

Likewise, said construction conditions the manufacturing of the product, so that it has a strong influence on the final cost of the shock absorber.

The configuration of the shock absorber described in JPH0626546A is capable of generating two damping laws: high load and low load. Controlled by the solenoid, a hydraulic passage in the area of the guide opens or closes, through which the damping fluid flows. Said passage is large enough for the hydraulic load to be low. However, if this passage is closed by the action of the solenoid, the oil cannot pass through it, meaning that it must do so either through the piston in the extension movements, or through the valve support in the compression movements. Both components have a series of adjusted valves to provide the desired high hydraulic load. Thus, two operating modes are offered for the shock absorber: one for comfort with low loads, and one for stability with high loads. However, any intermediate damping law that would be desirable at a given time cannot be obtained.

An improvement of said device can be seen in document US2014262654 A1 which discloses small solenoid valves arranged in the area of the guide, around the rod. Each of said solenoids can open or close a hydraulic passage for the fluid. The more open passages there are, the total area for the passage of the fluid will be greater, and therefore, the force of the shock absorber will be less. However, this design has the disadvantage of being able to perform only one regulation: open and/or closed, for each hydraulic passage. Thus, the shock absorber will have as many damping laws as there are solenoid valves, or the total passage that can be obtained by combining said areas. If the optimal damping law does not coincide with any of the available laws, it cannot be obtained.

Likewise, introducing more of these small solenoid valves entails a physical space limitation in the body of the shock absorber, so the number of laws that can be obtained will be limited by the available space. The fact that they are smaller solenoid valves also limits the force that they are able to exert to oppose the pressure that tends to open or close them.

This limitation forces the use of pressure application areas, as well as smaller oil passage areas, which limits either the range or the minimum damping load that can be obtained for a given speed, thus resulting in a disadvantage when it comes to obtain optimal damping. It also results in a design that is more likely to have dispersion in the hydraulic load as well as greater manufacturing complexity, since such small passages have to be manufactured.

There are other designs, such as the one described in ES2046898T3, which makes use of a rotary solenoid actuator, so that it opens or closes a number of hydraulic passages arranged concentrically around the rod. This design, however, faces the same problems as previous designs: by opening or closing a series of "N" discrete passages, it is capable of offering "N" damping laws.

Other designs on the market are those where shock absorbers offer continuous regulation of the hydraulic load. The device described in US20220128115A1 is an example of this since it offers infinite damping laws between a maximum and a minimum. The configuration of said device consists of a solenoid valve connected laterally to the shock absorber. Said solenoid valve regulates a hydraulic mechanism. However, this configuration has some problems:

- The lateral arrangement of the solenoid valve worsens the compactness of the system, which is a drawback for the integration of the shock absorber within the suspension assembly. This limits the size of the solenoid that can be used.
- The size limitation of the solenoid of the solenoid valve limits its force, so that a hydraulic amplification mechanism is required to regulate the load of the shock absorber. This mechanism places the force of the solenoid against the force of the pressure in a very small area, so that the force created by the pressure is also small and can be handled by the solenoid. This pressure regulation is then transferred to larger areas, so that the load of the shock absorber is amplified.
- Said amplification mechanism requires highly precise parts that are difficult to manufacture and install.

SUMMARY OF THE INVENTION

The solenoid valve for shock absorbers of the present invention aims to provide an important advantage in relation to the compactness of the elements it comprises, but at a lower cost than the systems described in the background. Said solenoid valve offers continuous control with infinite damping laws between a maximum and a minimum, in other words, it is not limited to a specific number of operating curves like the aforementioned shock absorbers.

The use of space of the system described in the present application makes it possible to have an electromagnetic system capable of offering greater forces than systems that incorporate side valves, such as those mentioned in the background. As such, the hydraulic load amplification stage also mentioned in the shock absorbers present in the sector can be dispensed with. Thus, it is possible to obtain a simple, compact and easy-to-manufacture system. The fact of that the load amplification stage is not required is different from existing systems that offer infinite damping laws. There are other systems that offer a limited number of damping laws that do not require said amplification stage.

The present invention relates to a solenoid valve specially configured for a shock absorber with hydraulic load regulation.

Thus, said solenoid valve is configured to adjust axially, and hermetically or in a sealed manner, to a first end of a body of a shock absorber and to regulate the hydraulic load of the fluid that flows through the inside of the shock absorber.

The term "body of the shock absorber" must be understood as the central tubular portion thereof, which may comprise one or more tubes through which the damping fluid flows and is subjected to pressure, said fluid preferably being an oil, since it is an incomprehensible fluid, suitable for the described use.

The solenoid valve comprises a longitudinal hole, configured to guide and seal, in a longitudinal movement, a rod comprised in the shock absorber, said rod and hole being adjustable. In other words, the rod can move longitudinally inside the longitudinal hole of the solenoid valve, since it has a smaller section than that of the longitudinal hole, being able to have a specific clearance between both portions.

Thus, the solenoid valve performs the two aforementioned functions, that of regulating the passage of fluid through the inside of the shock absorber, and also that of guiding and retaining the movement of the rod in a compact manner, limiting its lateral movements and only allowing axial movement, avoiding the incorporation of elements in lateral arrangements that make it difficult to install the shock absorber in the machine or device to be damped, such as a vehicle.

To achieve this purpose, the solenoid valve comprises:

- a movable part that can be moved between a closed-end position and an open-end position, preferably in a longitudinal direction;
- a regulating chamber configured to receive and release fluid from the body of the shock absorber; and
- an elastic element configured to move the movable part, in the direction of movement of said movable part, in the direction of the open-end position towards the closed-end position of said movable part;

wherein the regulating chamber is configured to increase an internal pressure upon receiving fluid from the body of the shock absorber and transmit said pressure to the movable part, the movable part being configured to move from the closed-end position to the open-end position upon receiving a specific pressure from the regulating chamber when it raises its internal pressure. Thus, the regulating chamber is configured to release fluid when the movable part has moved from the closed-end position to the open-end position.

As indicated, the movable part moves preferably in the longitudinal direction, i.e., in the same direction as the rod, to allow the fluid to pass through the solenoid valve, functioning as a gate for the fluid through the solenoid valve. Nevertheless, the elements of the solenoid valve could be arranged so that the movement is not longitudinal, but transverse, rotating or a combination of the foregoing, depending on the features of said elements that make up the device. In other words, the direction of movement of the movable part does not have to be the same as that of the rod.

In addition to the mentioned components, the solenoid valve comprises electronic means configured to exert a force on the movable part, with the aim of moving it in the direction of movement, in a direction that is the same as that generated by the elastic element. In other words, the electronic means generate a movement load on the movable part, in addition to the load of the elastic element. Preferably, said load is magnetic and is activated upon receiving a control electric current, and it can be regulated to generate a greater or lesser thrust on the movable part, depending on the hydraulic load requirements of the shock absorber.

This would be the most basic configuration of the solenoid valve, with the movable part directly closing the regulating chamber with the elastic element that pushes said movable part towards the closing position and the electronic means that also generate a load to move the movable part.

The rigidity of the elastic element can be configured in relation to its state of deformation, so that it can provide specific and defined hydraulic behaviour for the shock absorber based on the configuration of its properties.

The use of this elastic element can compensate for the decrease in the force generated by the electronic means, preferably magnetic force, since the attractive force generated by the electronic means can decrease as the movable part slides. Thus, the total force that said movable part undergoes is the sum of the force to which it is subjected by the electronic means, plus that of said elastic elements, where features such as rigidity and preload, desired in both means to achieve proper hydraulic operation of the shock absorber, can be obtained.

Continuous control of the hydraulic load is achieved through electronic means, said control being different from the staged controls mentioned in the background. Furthermore, since said means are located in the solenoid valve and since said valve can be adjusted axially, and hermetically or in a sealed manner, to a first end of a body of a shock absorber, it is possible to advantageously use the space available in the solenoid valve, which in turn enables obtaining a load through electronic means, preferably magnetic forces, that is large enough to not have to use an amplification stage.

The hydraulic pressure that reaches the regulating chamber, coming from the body of the shock absorber (when the solenoid valve is connected to the body and when a movement of the compression or extension rod is being generated) is applied to a portion of the movable part, which is controlled. Said pressure creates a force that tends to move said movable part so that the oil exits the regulating chamber, to relieve the hydraulic pressure. In other words, the movement of the movable part opens the solenoid valve, which allows fluid to exit the regulating chamber, modifying the load of the shock absorber.

The opening pressure of the solenoid valve is controlled by regulating the force, generated by the electronic means, on the movable part, which throttles and closes the passage of oil from the regulating chamber. Said force, preferably magnetic, can vary based on a control current, provided to the electronic means.

In one embodiment, the movable part comprises one or more hydraulic ducts or passages configured to allow the passage of fluid released by the regulating chamber, through an expansion chamber, towards a reserve chamber, of the body of the shock absorber. These ducts or passages allow the fluid that reached the regulating chamber to be directed back to a fluid circuit contained in the body of the shock absorber.

Furthermore, the solenoid valve may also have a controlled leak that connects the regulating chamber with a low pressure area (expansion chamber) of the body, which may be desirable to obtain a specific hydraulic behaviour at specific movement speeds of the rod. Preferably, the controlled leak is comprised in the main valve of the solenoid valve.

In one embodiment, the solenoid valve comprises a low-friction bushing arranged inside the solenoid valve, adjustable with clearance on the rod of the shock absorber, said low-friction bushing being configured to guide the longitudinal movement of the rod. This bushing is adjusted to other components of the solenoid valve in such a way that, preferably, it does not move in any direction, since its objective is to support the rod when it is subjected to lateral forces.

As usual, controlled lubrication channels can also be provided to ensure the correct lubrication of the movable elements comprised in the solenoid valve, as well as the discharge of gas that may flow to this area, towards an expansion chamber of the body of the shock absorber.

In one embodiment, the solenoid valve comprises a hydraulic seal arranged inside the solenoid valve, adjustable to the shock absorber rod, configured to seal, hermetically, the shock absorber and prevent it from spilling or losing oil to the outside. The hydraulic sealing function of the shock absorber rod is usually performed by a retainer in the shock absorbers on the market.

In one embodiment, the solenoid valve comprises a connection bushing, configured to be assembled to a longitudinal inner tube of the damping body, being adjusted with clearance to the rod of the shock absorber, where the adjustment with clearance between the connection bushing and the rod comprises a duct for passage of fluid from the inner tube to the regulating chamber of the solenoid valve, which allows fluid to be transferred to said regulating chamber. Given this description, it is understood that the rod moves in the longitudinal direction of the inner tube and that said tube comprises fluid of the shock absorber therein, so that when the rod moves in the longitudinal direction, part of said fluid in the inner tube passes to the regulating chamber of the solenoid valve.

In one embodiment, the solenoid valve comprises a sealing element located between the movable part and the connection bushing, configured to prevent fluid leaks from the regulating chamber. This sealing element can be a circular gasket adjusted to a slot in the bushing and/or in the movable part.

In one embodiment, the solenoid valve comprises a disc, adjustable with clearance to the rod of the shock absorber, where said disc is assembled to the connection bushing, and where said disc acts as a stop for the movable part in the closed-end position. In other words, it prevents the movable part from moving beyond said closed-end position despite the loads exerted by the electronic means and by the elastic element.

In one embodiment, the regulating chamber comprises an annular geometry concentric to the shock absorber rod to which the solenoid valve can be connected. Preferably, the annular geometry of the regulating chamber is delimited by the movable part, the connection bushing and the disc. In other embodiments, this regulating chamber can have different geometries. For example, a suitable geometry, in addition to or instead of the annular geometry, would be a geometry of holes or windows comprised in the disc part.

Through this regulating chamber, the movable part is subjected to a pressure difference, since in the area that borders the regulating chamber the movable part is at a higher pressure than in the rest of its surroundings, which border the low pressure zone. This is due to the fact that in one embodiment, where the solenoid valve is connected to the body of the shock absorber, the movable part is located blocking an expansion chamber of the shock absorber in an area or region opposite to an area that is in contact with the regulating chamber.

In one embodiment, the solenoid valve comprises a main valve located adjacent to the regulating chamber, configured to transmit the force created by the pressure of the regulating chamber on this main valve to the movable part, where said main valve comprises a portion, subjected to the pressure of the regulating chamber, that can be regulated.

This main valve can be configured in diameter, thickness, area on which pressure is applied and support point. This main valve can also be configured to prevent the oil flow from pushing directly on the movable part, so as to avoid sudden openings and vibrations in the system, said main valve comprising a diameter such that it covers the entirety of the movable part that is subjected to the pressure of the regulating chamber.

The addition of the main valve, in the solenoid valve, modifies the balance of forces of the system, so it can be used as an advantageous configuration. The application of a magnetic force, generated by the electronic means, of the movable part on the main valve is carried out on a controlled diameter, which creates a lever arm that opposes the force created by the pressure. This lever arm can be used to obtain greater shock absorber load ranges for a given magnetic force, compared to a system that applies hydraulic pressure from the regulating chamber directly to the movable part.

Thus, the main valve can be arranged either with the aim of maximizing the force of the movable part by taking advantage of its lever arm, or with the aim of preventing the flow of fluid from pushing the movable part more than desired, or with both functions at the same time.

Likewise, said main valve can be configured with a controlled pre-deformation if desired, either for reasons of minimum load or closing quality.

In one embodiment, the electronic means comprise a coil configured to generate a magnetomotive force that creates a magnetic flux when said coil receives a control current, said flux being configured to generate a load or force that allows the movable part to move in the direction of the open-end position to the closed-end position, preferably in a longitudinal direction; and where said movable part comprises a ferromagnetic material. In this way, the degree of opening of the solenoid valve, and therefore the load of the shock absorber to which it is connected, can be precisely controlled.

In a more specific embodiment, the solenoid valve comprises a rod guide that comprises a hole which comprises a section (possibly comprising a second larger section in an end portion of said hole) slightly larger than the section of the rod of the shock absorber to which the solenoid valve can be connected, where said hole is arranged concentrically to the longitudinal path of the rod when the solenoid valve is connected to the body of the shock absorber. Obviously, the adjustment between the rod and the hole is one of play or clearance between them, so that longitudinal movement is allowed. Preferably, both the rod and the hole in the rod guide are cylindrical.

The rod guiding function is carried out jointly by the rod guide and the low-friction bushing arranged in the solenoid valve in an adjusted manner, such that both elements guide and support the rod when it is subjected to lateral forces.

In one embodiment, the rod guide, the movable part and the disc each comprise a ferromagnetic material, and where the solenoid valve comprises a functional magnetic circuit that comprises an assembly formed by the coil, the rod guide, the movable part and the disc, said functional magnetic circuit being configured to exert a force on the movable part and control the movement of the movable part between the closed-end position and the open-end position, preferably in the longitudinal direction, from bottom to top. Obviously, the magnetic circuit may comprise other construction elements of the system comprised in the solenoid valve. This embodiment is not incompatible with any of those mentioned above. The passage of magnetic flux between the disc and the movable part creates a magnetic force of attraction between both parts so that it closes and/or throttles the oil passage of the regulating chamber.

If the main valve has been arranged in said previous embodiment, the magnetic force created on this movable part is applied to the main valve, given that the main valve is the upper support of the movable part. This force can be applied to the outer diameter of the valve, but also on any other diameter, depending on how it has been configured.

If the force generated by the functional magnetic circuit together with the force generated by the elastic element is greater than the opening force of the solenoid valve, generated by the pressure of the regulating chamber applied to the corresponding surface, the solenoid valve is closed. Therefore, the fluid (oil) will not flow through the solenoid valve, forcing said fluid, in the case of longitudinal movement of the rod, to pass through a controlled leak that has been configured in a piston of the rod, in the solenoid valve, or by both.

In this way, the solenoid valve can be configured so that, when low longitudinal movement speeds of the rod in extension or compression occur, the pressure generated in the regulating chamber is lower than the opening pressure of the solenoid valve. This type of control at low rod speeds is usually sought in automotive vehicle suspensions, since it allows good control of the dynamic characteristics of the vehicle.

For faster movement speeds of the rod, the pressure in the regulating chamber would be higher, enough to reach the opening pressure of the solenoid valve. In other words, the pressure existing in the regulating chamber was high enough to overcome the forces that close the movable part on the regulating chamber.

Since the opening pressure of the solenoid valve can be regulated through the magnetic force created on the movable part, the pressure level from which the fluid is allowed to flow through the open solenoid valve is controlled, thus controlling the pressure in the inner tube of the body of the shock absorber. This pressure applied to the corresponding face of the rod piston creates the damping force.

In one embodiment, the elastic element comprises two or more different elastic stages, a first low-rigidity elastic stage and a second high-rigidity elastic stage. Thus, the rigidity may be low for small openings of the movable part, but the rigidity thereof increases for larger openings, so that when the system has large openings, there is a greater force that tends to close the solenoid valve, which may be suitable for preventing the appearance of vibrations from certain operating speeds of the shock absorber that cause large openings of the solenoid valve.

In one embodiment, the elastic element comprises an element selected from: a disc valve, a plurality of stacked disc valves, a helical spring, a wave spring, a disc spring, a combination of the foregoing or any other element that can perform the function of an elastic element. Through these embodiments, a variable rigidity compatible with the previous embodiment can be obtained. It is also possible to limit the opening of the disc valves by including an additional valve on which it abuts as the system opens, in order to have variable rigidity.

In one embodiment, the solenoid valve comprises a modular element that comprises a cover joined to the electronic means, such as the coil, where said modular element can be assembled to the rest of the assembled components comprised in the solenoid valve, by means of a removable mechanical joint. This modular embodiment allows a shock absorber to be manufactured in a traditional way, remaining closed and sealed, and then inserting the cover with the coil (or solenoid).

In one embodiment, the modular element comprises a wired connection connected to the electronic means, where said wired connection is configured to connect, electronically, to the control means of the solenoid valve. This configuration makes it easier to manufacture the solenoid valve, so there is no need to deal with the connection cable required to issue the control on the manufacturing line. Moreover, with this configuration, the coil (or solenoid) is not exposed to high-pressure, high-temperature fluid, so the tightness requirements for the coil are much lower, making it simpler and cheaper.

The invention also comprises the shock absorber with hydraulic load regulation that comprises a solenoid valve, as described in any of the previous embodiments, adjusted hermetically to a first end of a body comprised in said shock absorber, where said shock absorber comprises a rod that can be moved longitudinally inside said body, said rod passing through the longitudinal hole in the solenoid valve.

In one embodiment of the shock absorber, the rod comprises a piston subassembly, connected to a lower end portion of said rod, and which is located inside the body, sharing longitudinal movement with said rod, where said piston subassembly comprises one or more assembled piston valves that comprise configurable rigidity and pre-deformation.

The piston subassembly may be similar to those used in the described shock absorbers of state of the art. This subassembly can incorporate a series of piston valves that define its characteristic operation, which have a configurable rigidity and pre-deformation. A controlled permanent leak may or may not be incorporated by means of these piston valves. Said configuration will be oriented so that, in the extension movement of the rod, the fluid (preferably oil) is forced to pass through the solenoid valve.

In one embodiment of the shock absorber, the body of the shock absorber comprises:

- an inner tube assembled, by an upper end portion of said inner tube, to the solenoid valve, said inner tube being configured to house the rod during its longitudinal movement; and
- an outer tube assembled, by an upper end portion of said outer tube, to the solenoid valve, the inner tube being located inside the outer tube.

Preferably, both tubes comprise a cylindrical shape and are arranged concentrically.

The inner tube comprises a lower chamber located between a lower end portion of said inner tube and the piston subassembly of the rod; and an upper chamber located between the piston subassembly of the rod and the solenoid valve.

In the same way, the shock absorber comprises a reserve chamber and an expansion chamber, located between the inner tube and the outer tube, both chambers being in contact, differentiated in that the expansion chamber contains air inside the same and the reserve chamber contains fluid. In this way, it can be indicated that the solenoid valve is configured to limit the passage of fluid of the shock absorber between the chambers of the inner tube to the chambers of the outer tube.

In one embodiment, the shock absorber comprises an intermediate tube located between the inner tube and the outer tube, configured to direct the fluid of the shock absorber from the solenoid valve to a lower portion of the reserve chamber.

The use of this third tube is appropriate to prevent an unwanted mixture of gas and oil, or foaming, that can occur in the reserve chamber, when said chamber receives fluid from the solenoid valve, especially when a movement of the rod occurs at high speed.

In one embodiment, the shock absorber comprises a valve support subassembly adjusted, hermetically, to a second end of the body of the shock absorber, (opposite to the end where the solenoid valve is adjusted) where the valve support subassembly comprises one or more assembled valves that comprise configurable rigidity and pre-deformation.

The valve support subassembly, like the piston subassembly, may be similar to those described in the state of the art. In this way, it can incorporate a series of support valves that define its characteristic operation, which may or may not incorporate a controlled permanent leak, since said support valves have a configurable rigidity and pre-deformation. Like the case of the piston, said configuration can be oriented so that, in the compression movement of the rod, the fluid (oil) is forced to pass through the solenoid valve.

In one embodiment, the shock absorber comprises a complementary solenoid valve adjusted hermetically to a second end of the body comprised in said shock absorber.

The operation and components of this complementary solenoid valve would be the same as the solenoid valve described in the previous embodiments.

With this embodiment, the shock absorber loads in extension and compression can be controlled independently, achieving a better compromise between comfort and the dynamic behaviour of the vehicle.

BRIEF DESCRIPTION OF THE DRAWINGS

The terms FIG., FIGS., Figure, and Figures are used interchangeably in the specification to refer to the corresponding figures in the drawings.

To complement the following description and for the purpose of helping to better understand the features of the invention, a set of drawings is attached to the present specification, in the figures of which the most characteristic details of the invention are represented by illustration and not limitation.

LIST OF REFERENCE NUMBERS SHOWN IN THE FIGURES

Figure 1A:
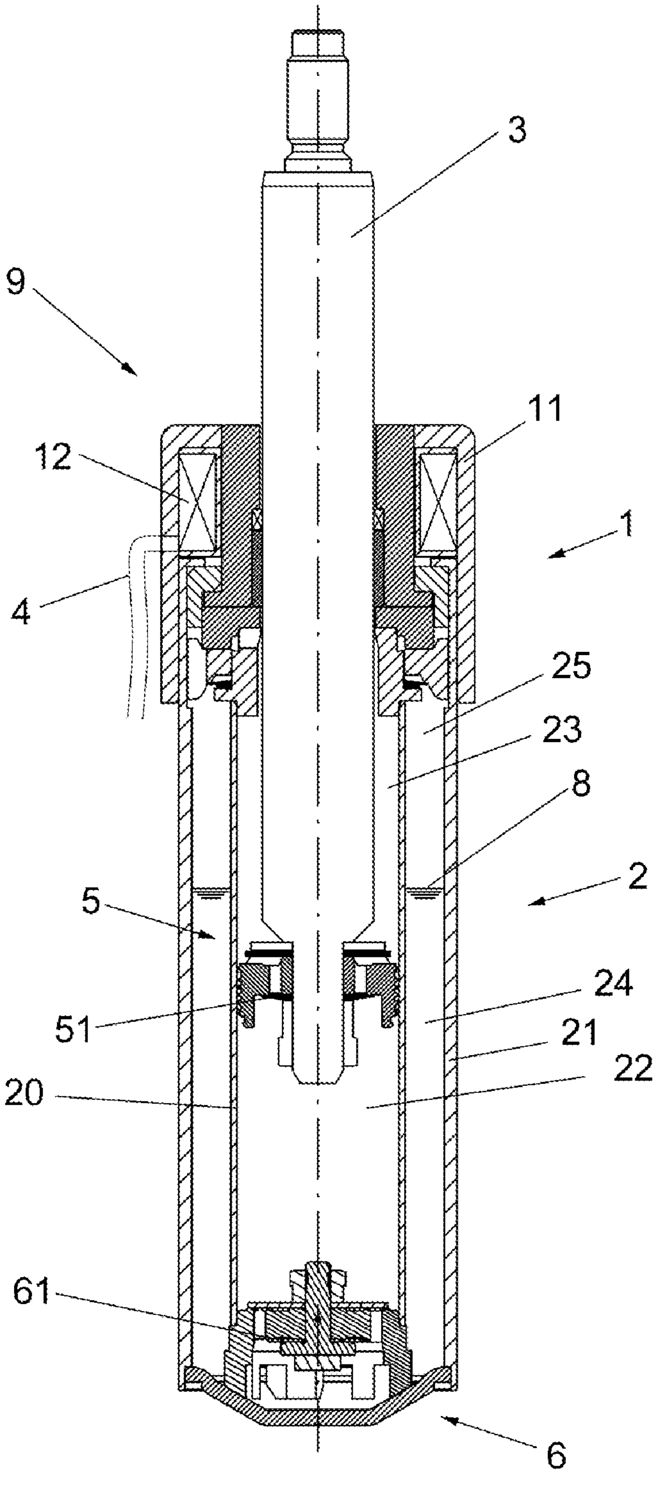
FIG. 1A shows an elevation view, sectioned in half, of the shock absorber comprising a solenoid valve connected to the first end of the body of the shock absorber, in its simplest configuration, the piston subassembly of the rod being in a longitudinal intermediate position inside the inner tube, and a valve support subassembly connected to a second end of the body, by the lower end portions of the inner and outer tubes.

1. Solenoid valve
2. Body
3. Rod
4. Wired connection
5. Piston subassembly
  51.—Piston valves
6. Valve support subassembly
  61.—Support valves
7. Connector
8. Fluid
9. Shock absorber
10. Disc
11. Cover
12. Coil
13. Movable part
  131. Hydraulic duct
14. Regulating chamber
15. Elastic element
16. Low-friction bushing
17. Main valve
18. Hydraulic seal
19. Rod guide
20. Inner tube
21. Outer tube
22. Lower chamber
23. Upper chamber
24. Reserve chamber
25. Expansion chamber
26. Intermediate tube
27. Sealing element
28. Connection bushing
29. Complementary solenoid valve
($C_H$) Hydraulic load
($V_{DV}$) Movement speed of the rod in the longitudinal direction
(E) Rod extension
(C) Rod compression
(D) Movement of the movable part
(F) Force applied on said movable part
($F_M$) Magnetic force applied by the electronic means
($F_{EE}$) Force of the elastic element
($F_T$) Total sum of the force of ($F_M$) and ($F_{EE}$)

($C_{ME}$) Maximum load in extension
($C_{mE}$) Minimum load in extension
($C_{mC}$) Minimum load in compression
($C_{MC}$) Maximum load in compression.

DESCRIPTION OF THE INVENTION

FIG. 1A shows a shock absorber (9), object of the invention, which comprises a body (2), a rod (3) and a solenoid valve (1), also object of the invention, adjusted or assembled, hermetically, to a first end of the body (2).

Said FIG. 1A also shows that the body (2) of the shock absorber (9) comprises two tubes: an outer tube (21) and an inner tube (20) located in an internal cavity of the outer tube (21), both being cylindrical and arranged concentrically.

The shock absorber (9) comprises a usual shock absorber arrangement, such as those existing on the market, which comprises a rod (3), movable in a longitudinal direction inside the body (2), specifically inside the inner tube (20), both being positioned concentrically, said rod (3) comprising a cylindrical bar shape with two ends. A lower end portion of said rod (3) is connected to a piston subassembly (5), which is always inside the inner tube (20), while the opposite end portion, the upper one, is outside and configured to connect to the element to be damped, such as the structure of a vehicle.

The piston subassembly (5) of the rod (3) divides the internal cavity of the inner tube (20) into two parts. A lower chamber (22) and an upper chamber (23) such that when the rod (3) moves longitudinally with respect to the body (2), a fluid (8), preferably oil, contained inside said chambers (22, 23) can pass in a regulated manner, from one to the other, through piston valves (51), located in the piston subassembly (5), generating a pressure difference between both faces of the piston, which results in a specific load. In other words, the hydraulic load of the shock absorber will be determined, in part, based on the permitted flow regime of fluid (8) through said piston valves (51).

This piston subassembly (5) is similar to those existing in the state of the art where the series of piston valves (51) define its characteristic operation. It may or may not incorporate a controlled permanent leak and the assembled valves have a configurable rigidity and pre-deformation.

Between the inner tube (20) and the outer tube (21) is a reserve chamber (24) that houses fluid (8) and is connected to the lower chamber (22) of the inner tube (20), in one embodiment, by means of a valve support subassembly (6) which in turn comprises support valves (61). This valve support subassembly (6) is assembled or adjusted, hermetically, to a second end of the body (2), to both tubes (20, 21).

When the rod (3) moves longitudinally with respect to the body (2), as an extension, the fluid (8) contained in the reserve chamber (24) can pass through the support valves (61) towards the inside of the lower chamber (22), in a regulated regime.

This valve support subassembly (6) is also similar to those existing in the state of the art, as well as the support valves (61) that define its operation. Likewise, it may or may not incorporate a controlled permanent leak and the assembled support valves (61) have a configurable rigidity and pre-deformation.

The configuration of the piston and the valve support will be oriented so that, in the extension and/or compression movement of the rod (3), the oil is forced to pass through the solenoid valve (1), which allows the hydraulic load ($C_H$) of the shock absorber (9) to be adapted at each instant.

Since the reserve chamber (24) is not completely filled with fluid (8), the upper portion of the cavity comprised between the inner tube (20) and the outer tube (21) is occupied by an expansion chamber (25) configured to house gas from inside the shock absorber (9).

Figure 1B:
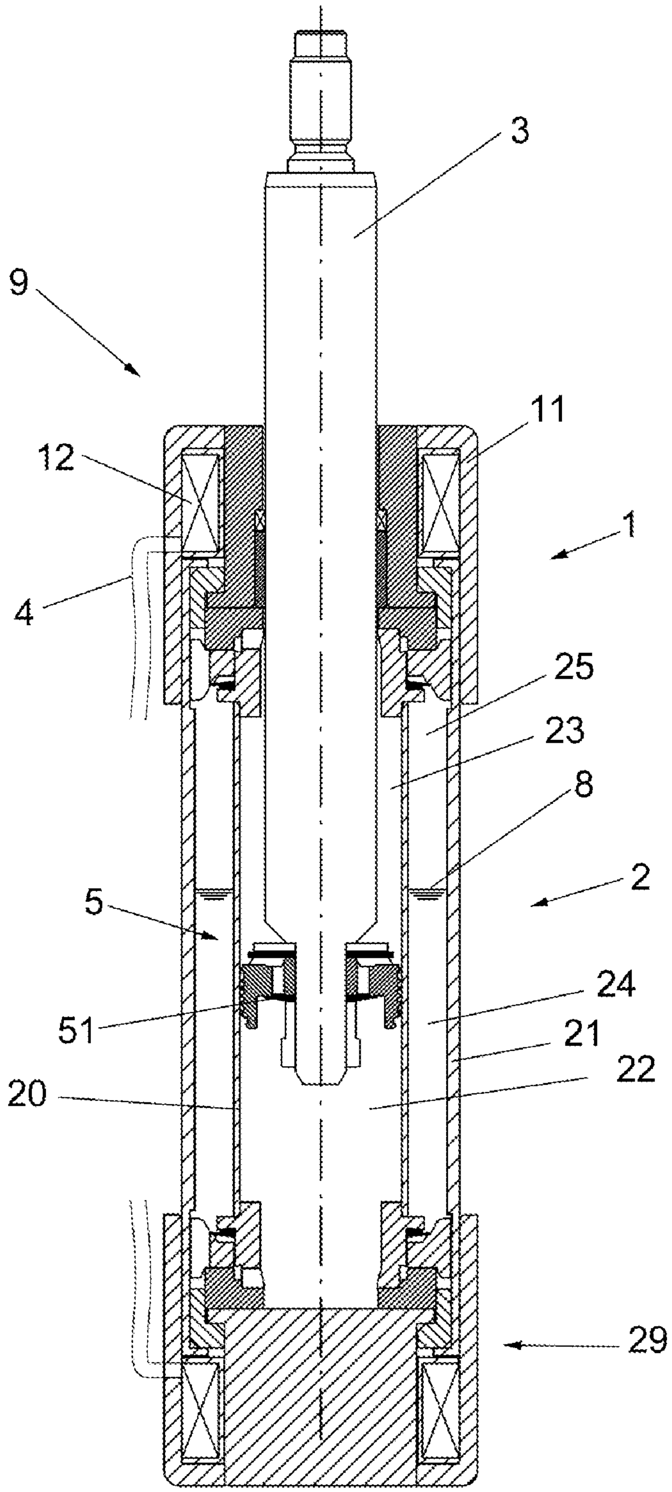
FIG. 1B shows a view similar to the view shown in FIG. 1A, where the shock absorber comprises two solenoid valves, where the complementary solenoid valve replaces the valve support subassembly of FIG. 1A, connected to the second end of the body.

In order to obtain a hydraulic load ($C_H$) that can be regulated in the shock absorber (9), which is the objective of the invention, the shock absorber (9) comprises at least one solenoid valve (1) as shown in FIGS. 1A, 1B and, in detail, 1C.

These figures show how said solenoid valve (1) comprises a wired connection (4) which can transmit a control current from the outside to the solenoid valve (1) to determine the desired flow of fluid (8) between the upper chamber (23) and the reserve chamber (24), through the expansion chamber (25), which allows the exact hydraulic load ($C_H$) to be determined at each instant, taking into account the configuration of the rest of the elements of the shock absorber (9), such as the support valves (61) and the piston valves (51).

In addition to allowing a regulated flow of fluid (8), the solenoid valve (1), being connected axially and hermetically to the first end of a body (2) of the shock absorber (9), also performs the guide and sealing functions of the rod (3) in its longitudinal movement with respect to the body (2), this being a feature that does not exist in lateral connection solenoid valves. Likewise, its axial connection on the body (2), by advantageously using the available space and thereby achieving greater magnetic forces, allows the solenoid valve (1) to not require a hydraulic amplification mechanism to provide different hydraulic loads to the shock absorber (9), as the lateral connection solenoid valves do.

Figure 1C:
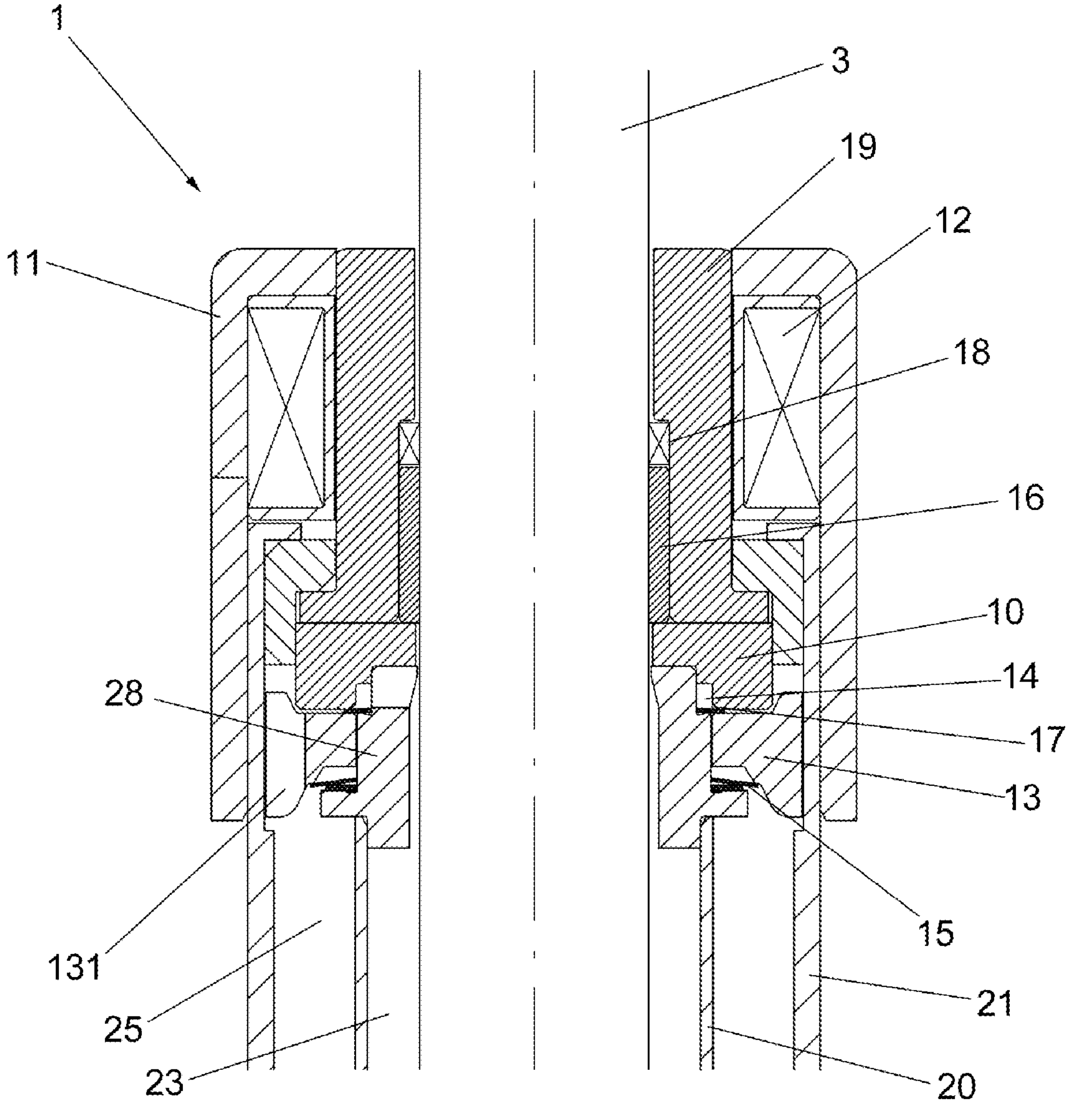
FIG. 1C shows a detailed view of the solenoid valve in FIG. 1A that clearly represents each of the components of the solenoid valve as well as its arrangement.

FIG. 1C shows that there is a low-friction bushing (16) inside the solenoid valve (1) and it performs the guiding function of the rod (3), also serving as support when said rod is subjected to lateral forces.

In addition to said low-friction bushing (16), the solenoid valve (1) also comprises a rod guide (19) that comprises a hole with a constant section slightly larger than the section of the rod (3). Said hole is arranged concentrically to the longitudinal path of the rod (3) and allows the rod guide (19) to delimit its path. In the same way, the low-friction bushing (16), which is fitted into the rod guide (19), delimits the path of the rod (3) together with the rod guide (19) or independently.

The hydraulic sealing function of the rod (3) with respect to the body (2) of the shock absorber (9), usually carried out by a gasket, is carried out by a hydraulic seal (18) comprised inside the solenoid valve (1).

To regulate the hydraulic load of the shock absorber (9), the solenoid valve (1) mainly comprises a movable part (13) that can be moved, according to the embodiment shown in the figures, in a longitudinal direction, which acts as a passage gate for the fluid (8) inside the solenoid valve (1). This movable part (13) can move between a closed-end position and an open-end position, and can be placed in infinite intermediate positions between both ends. For example, in FIG. 1C, the movable part (13) is in a closed-end position and in FIG. 4B it is moved from said position to the open-end position, allowing the passage of the fluid (8) through the solenoid valve (1).

The solenoid valve (1) also comprises a series of elements or devices configured to move the movable part (13): a regulating chamber (14), configured to receive and release fluid (8) from the body (2) of the shock absorber (9), specifically from the upper chamber (23) towards the reserve chamber (24), passing through the expansion chamber (25), (depending on the position of the movable part); an elastic element (15), configured to move the movable part (13), in the direction of movement, in the direction of the open-end position towards the closed-end position of said movable part (13); and electronic means configured to move the movable part (13), also in the direction of movement, in the same direction as the elastic element (15), for example, when a coil (12) receives a control electric current, generating a magnetic force ($F_M$) on said movable part (13), preferably an attraction load.

Figure 2A:
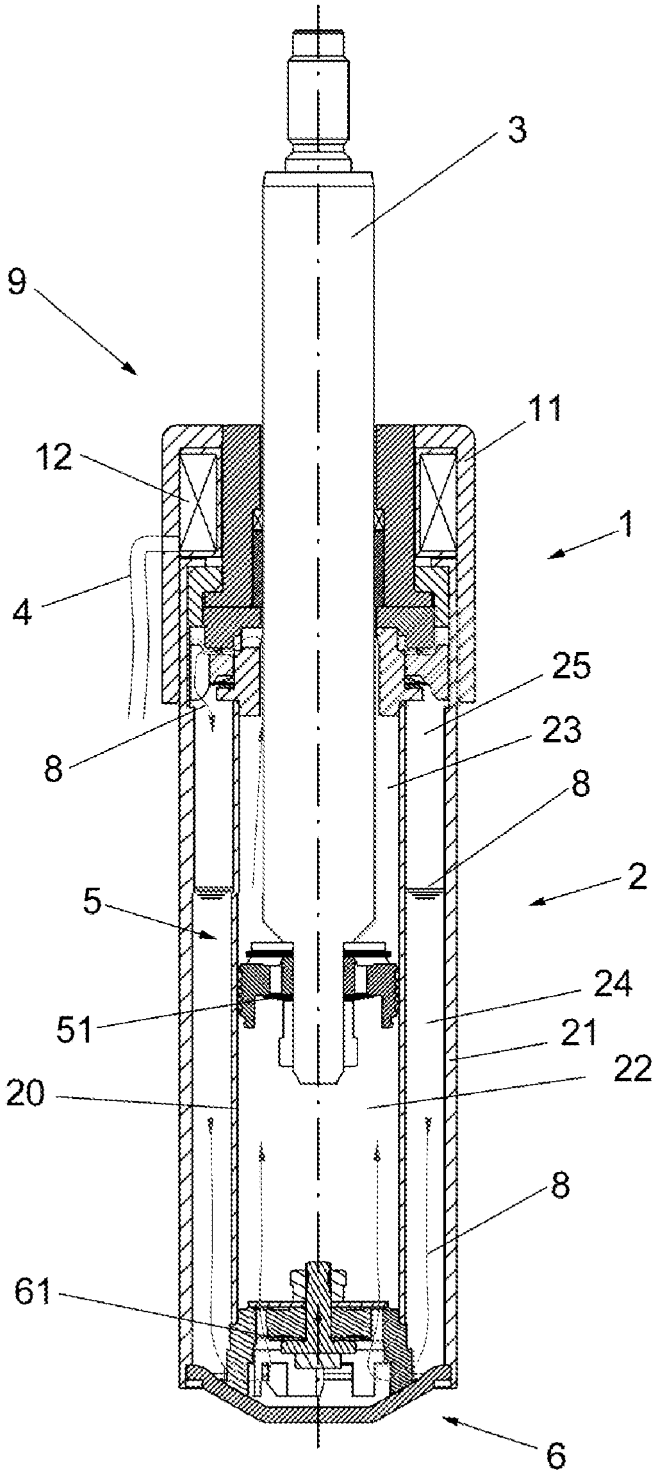
FIG. 2A shows the same view of the shock absorber shown in FIG. 1A, where the flow of the fluid of the shock absorber can be observed, in an extension movement of the rod, with respect to the body of the shock absorber, where the solenoid valve is in an open state, i.e., with the movable piece longitudinally moved from the closed-end position.
Figure 2B:
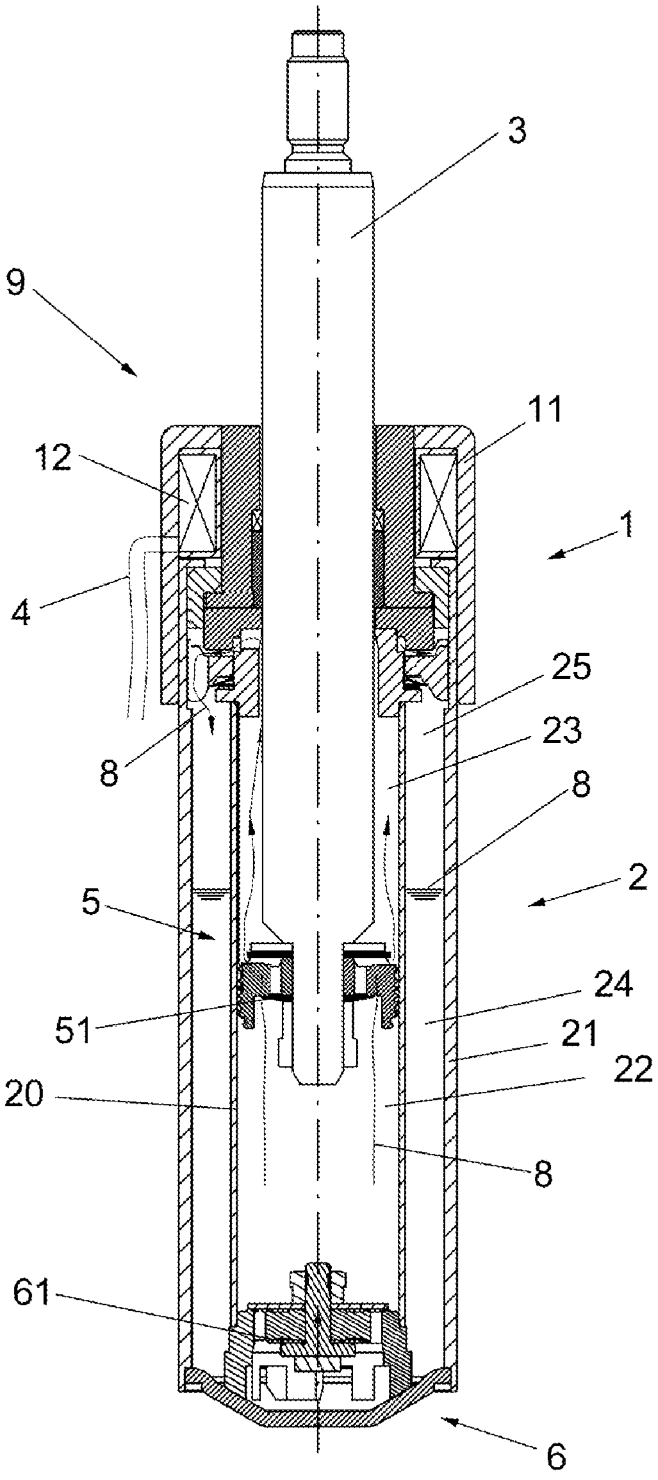
FIG. 2B shows the same view of the shock absorber shown in FIG. 1A, where the flow of the fluid of the shock absorber can be observed, in a compression movement of the rod, with respect to the body of the shock absorber, where the solenoid valve is in an open state, i.e., with the movable piece longitudinally moved from the closed-end position.

As shown in FIGS. 2A and 2B, the operation of the solenoid valve (1) consists of, when the rod (3) moves longitudinally with respect to the body (2) of the shock absorber (9), the regulating chamber (14) receiving fluid from the upper chamber (23) which generates an increased internal pressure that transmits it to the movable part (13). Said movable part (13) begins to move from the closed-end position to the open-end position when the pressure exerted by the regulating chamber (14) exceeds a specific pressure.

Said specific pressure is defined by the configuration of the elastic element (15) and the electronic means which exert a force in a direction opposite to the force exerted by the hydraulic pressure of the regulating chamber (14) on the movable part (13).

In this way, once the rod (3) moves fast enough to move the fluid (8) from the upper chamber (23) towards the solenoid valve (1) with a high pressure, said fluid (8) being directed at said high pressure towards the regulating chamber (14), reaching a pressure limit higher than that exerted by the elastic element (15) and the electronic means, the movable part (13) moves towards the open-end position.

Once the movable part (13) has moved from the closed-end position, as shown in FIGS. 2A and 2B, the regulating chamber (14) releases fluid (8) through one or more hydraulic ducts (131) of said movable part (13), directing said fluid (8), after passing through the expansion chamber (25), towards the reserve chamber (24) contained in the body (2) of the shock absorber (9).

As shown in FIG. 1C, the solenoid valve (1) is connected to the first end of the body (2) of the shock absorber (9), specifically to the inner tube (20), by means of a connection bushing (28), which is adjusted with clearance to the rod (3). Said adjustment with clearance comprises a duct for passage of fluid (8) from the inner tube (20) to the regulating chamber (14), which is the one that connects the upper end of the upper chamber (23), which is filled with oil, to the regulating chamber (14).

As also shown in FIG. 1C, to avoid the loss of fluid (8) in the shock absorber, the solenoid valve (1) comprises the hydraulic seal (18) adjusted to the rod (3) that tightly seals the upper chamber (23), said seal (18) being attached to the rod guide (19).

Figure 3:
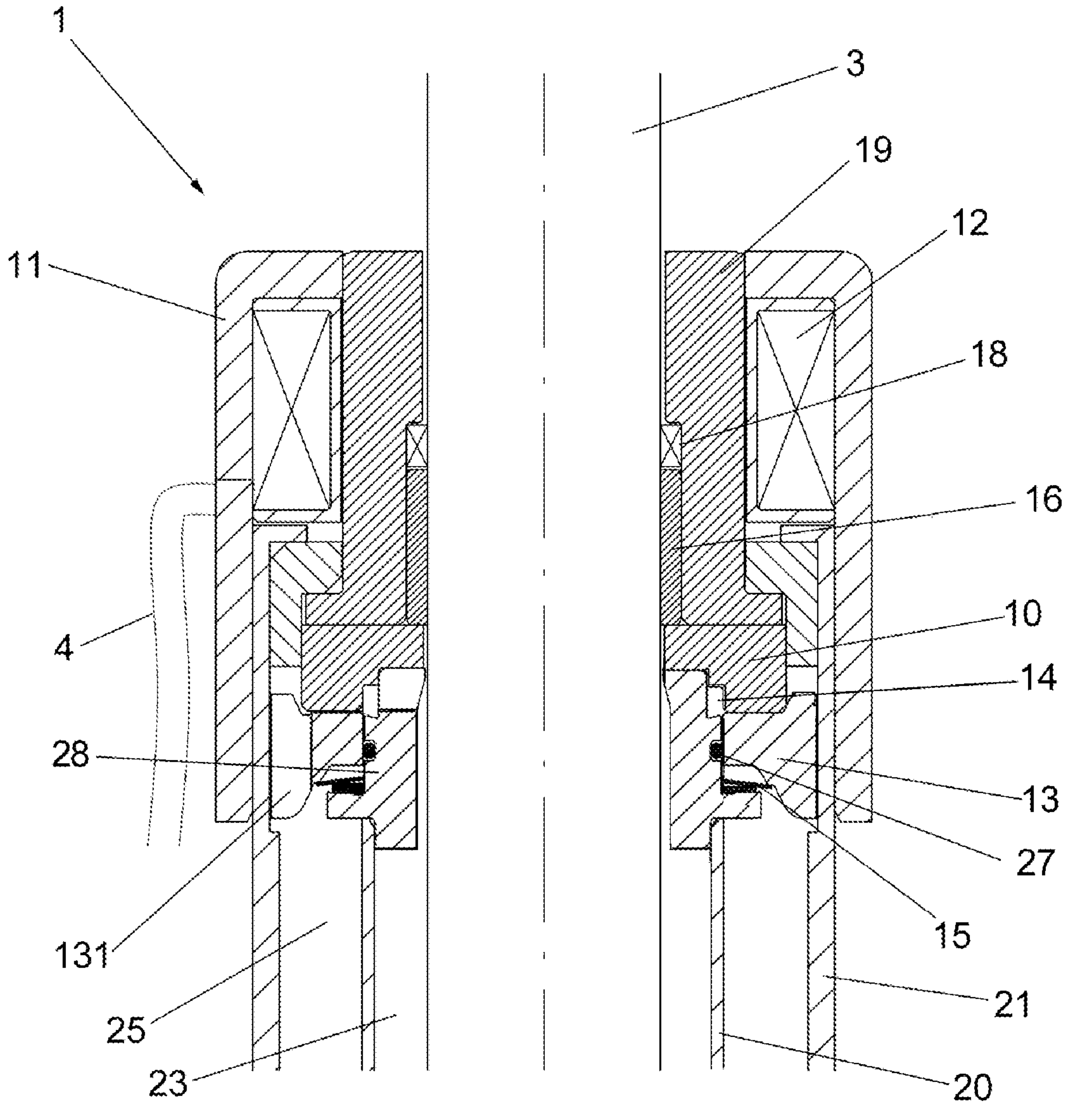
FIG. 3 shows a detailed view of the solenoid valve as shown in FIG. 1C, which comprises a sealing element located between the movable part and the connection bushing.

As shown in FIG. 3, the solenoid valve (1) can also comprise a sealing element (27) between the movable part (13) and the connection bushing (28), which prevents an uncontrolled leak of oil from the regulating chamber (14).

This regulating chamber (14) can have different geometries depending on the configuration of the shock absorber (9). For example, an appropriate geometry is an annular geometry, or also a geometry of holes or windows made through a disc part (10).

Said disc part (10) is comprised inside the solenoid valve (1), being adjustable with clearance to the rod (3) of the shock absorber (9). This disc (10) is assembled to the connection bushing (28) and acts as a stop for the movable part (13) in the closed-end position. In other words, it prevents the movable part (13) from moving beyond said closed-end position, despite the loads exerted by the electronic means and by the elastic element (15). Since it is a part near the movable piece (13), openings or windows that function as a regulating chamber (14) can be made.

FIG. 1C also shows that the annular geometry of the regulating chamber (14) is delimited by the movable part (13), the connection bushing (28) and the disc (10). In this way, it is understood that the movable part (13) can move longitudinally, from the closed-end position to the open-end position, due to the difference in pressures to which it is subjected. On the one hand, the movable part (13) is in contact with the regulating chamber (14) and on an opposite surface, it is located blocking an expansion chamber (25) of the shock absorber (9).

Figure 4A:
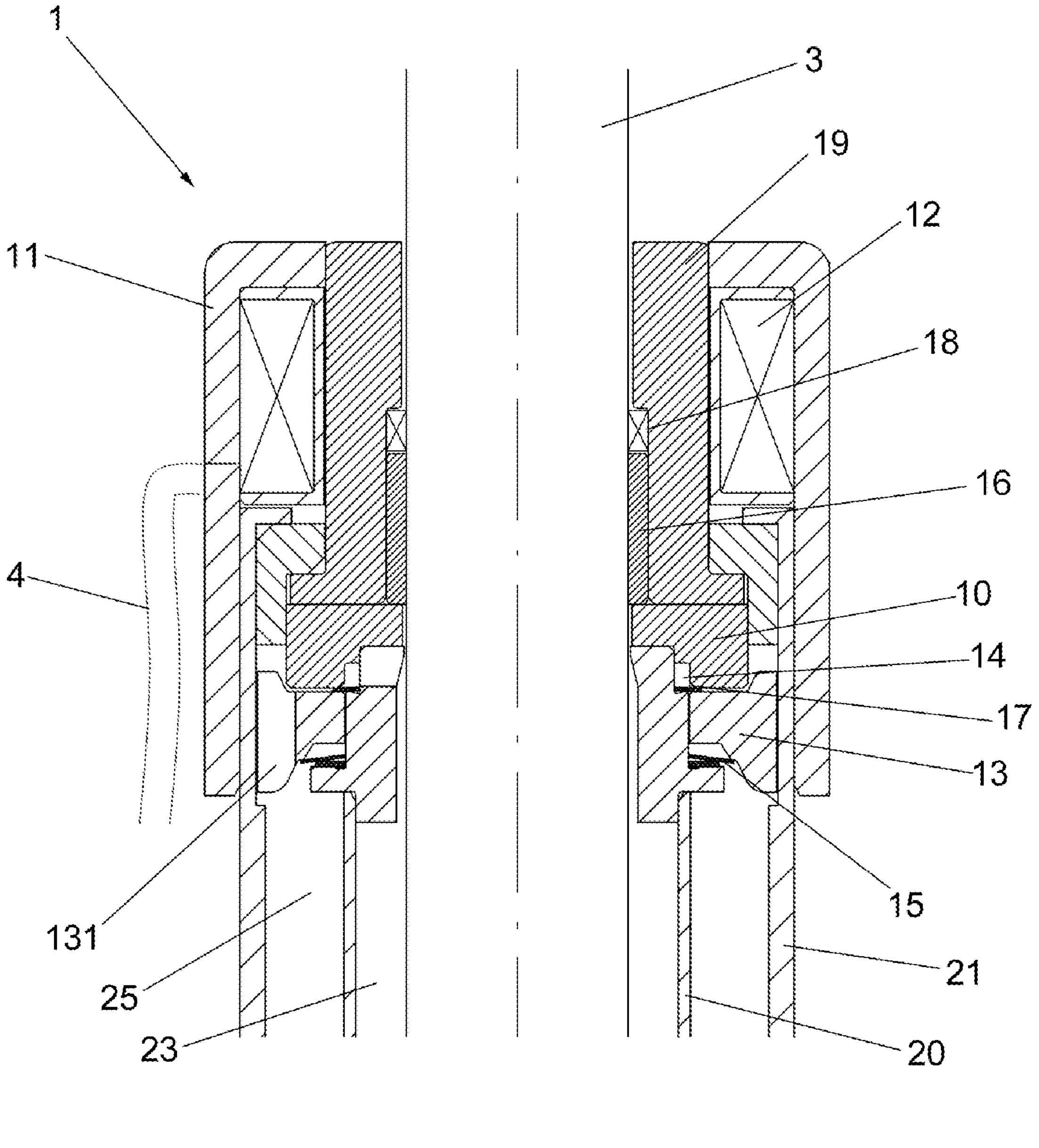
FIG. 4A shows a detailed view of the solenoid valve as shown in FIG. 1C, which comprises a main valve between the movable part and the regulating chamber, where the solenoid valve is closed, i.e., with the movable part in the closed-end position.
Figure 4B:
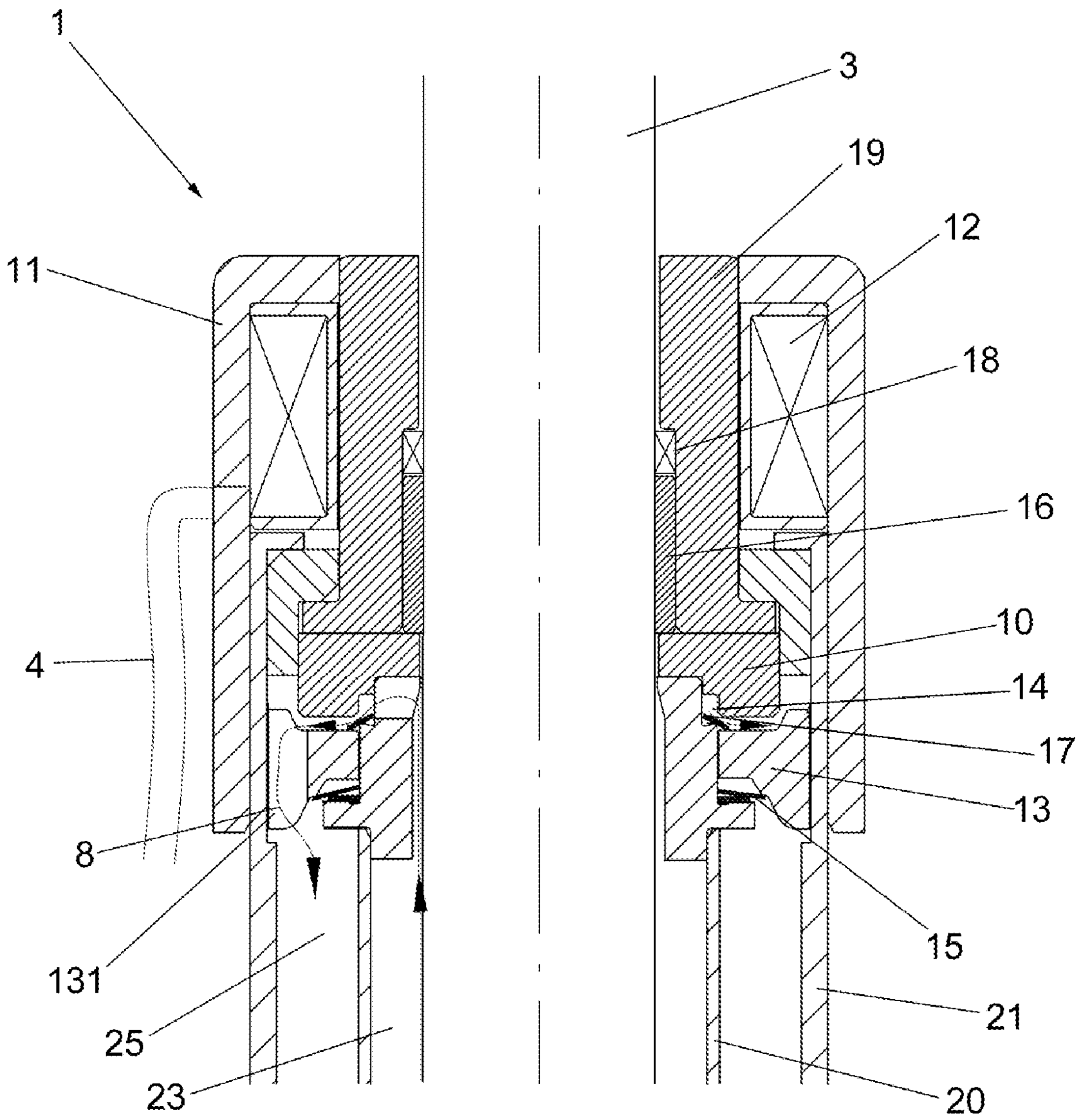
FIG. 4B shows a detailed view of the solenoid valve as shown in FIG. 1C, which comprises a main valve, where the solenoid valve is open, i.e., where the movable part is moved from the closed-end position to the open-end position, the main valve exerting a lever effect due to the pressure load generated in the regulating chamber.
Figure 4C:
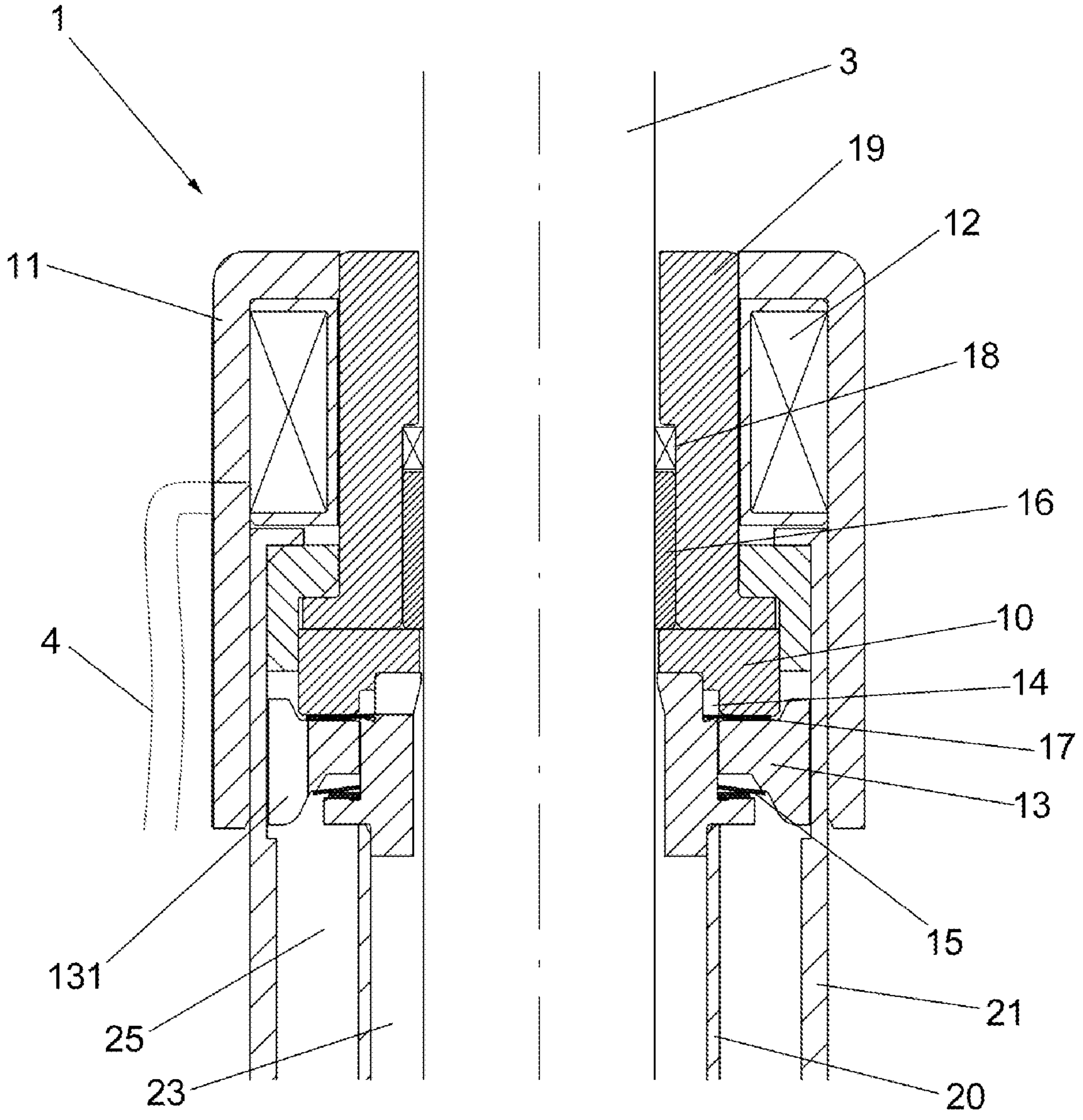
FIG. 4C shows a detailed view of the solenoid valve as shown in FIG. 4A, i.e., where the solenoid valve is closed, the main valve comprises an increase in outer diameter and said main valve avoids direct contact of the oil exiting the regulating chamber with the movable part in case it moves from the closed-end position.

Instead of closing the regulating chamber (14) directly with the movable part (13), the solenoid valve (1) may comprise a main valve (17), located adjacent to said regulating chamber (14), being configured to transmit the force created by the pressure of the regulating chamber (14) to the movable part (13), as shown in FIGS. 4A to 4C. Said main valve (17) comprises a portion subjected to the pressure of the regulating chamber (14), which can be regulated. This pressure will create a downward force that will be transferred to the movable part (13) in its opening movement. The portion of the main valve (17) that is subjected to pressure can be regulated in order to obtain different operating ranges of the loads of the shock absorber (9).

Likewise, main valves (17) of different outer diameters and thicknesses can be selected, which influence the transfer of the force to the movable part (13) from the regulating chamber (14). Said main valve (17) can also be configured with a controlled pre-deformation if desired for reasons of minimum load or closing quality. In fact, a controlled leak that connects the regulating chamber (14) to the expansion chamber (25) can be provided.

As indicated, the pressure that reaches the regulating chamber (14) is applied to the movable part (13). Said pressure creates a force that tends to move said movable part (13) so that the fluid (8) exits the regulating chamber (14), to relieve the hydraulic pressure. However, and as indicated, a series of forces also act on the movable part (13), which tend to close it and thus make it difficult to open. These forces are those generated by the elastic element (15) and by the electronic means, where the magnetic force ($F_M$) is what determines the regulation of the hydraulic load ($C_H$) of the solenoid valve (1).

As shown in FIG. 1C, the movable part (13) is pushed, on its lower face, by one or a series of elastic elements (15), so that the exerted force is transmitted in a way that guarantees the closure of the solenoid valve (1) in the absence of other forces.

Likewise, the electronic means of the solenoid valve (1) comprise a coil (12) or solenoid capable of generating a magnetomotive force that creates a magnetic flux on some parts inside the solenoid valve (1), when said coil receives a control current. Said flow allows the movable part (13) to move between the open-end position towards the closed-end position, by generating a magnetic force ($F_M$) of attraction on the movable part (13), since said movable part (13) comprises a ferromagnetic material. In other words, the generated magnetic force ($F_M$) tends to push the movable part (13) so that it closes the regulating chamber (14) through the attraction of elements such as the rod guide (19) and the disc (10) also made of a ferromagnetic material.

Figure 9A:
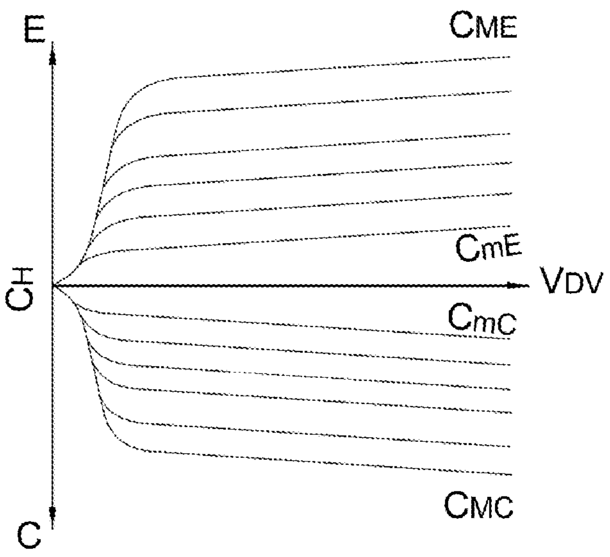
FIG. 9A shows a diagram that relates the hydraulic load ($C_H$) of the shock absorber on the Y-axis with the movement speed of the rod ($V_{DV}$) on the X-axis. The positive portion of the hydraulic load ($C_H$) (Y-axis) shows the different damping loads for the extension (E) of the rod, and the negative portion shows the loads for the compression (C), being able to have infinite loads or damping laws due to the infinite different levels of force that can be exerted on the movable part in the movement that it can undergo due to the effect of the coil of the electronic elements.

Therefore, the opening pressure of the solenoid valve is controlled by regulating this magnetic force ($F_M$) created on the movable part (13), which throttles and closes the passage of fluid (8) from the regulating chamber (14). Since said magnetic force ($F_M$) is variable according to a control current provided to the coil (12), infinite hydraulic loads ($C_H$), as shown in FIG. 9A, of both compression and extraction of the rod (3) are available.

Figure 9B:
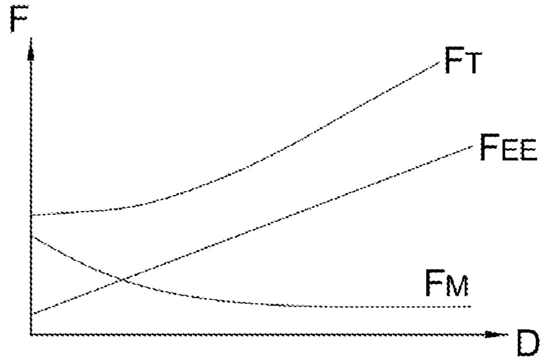
FIG. 9B shows a diagram that represents the movement (D) of the movable part in a longitudinal direction on the X-axis, and the force (F) applied on said movable part on the Y-axis, representing three lines. A curved line that shows how the magnetic force ($F_M$) decreases as the movable part moves away from the electronic elements, a straight line that shows how the force of the elastic element ($F_{EE}$) increases linearly as the movable part moves away from the closed-end position, and a line that shows the total force ($F_T$), the sum of both previous lines.
Figure 9C:
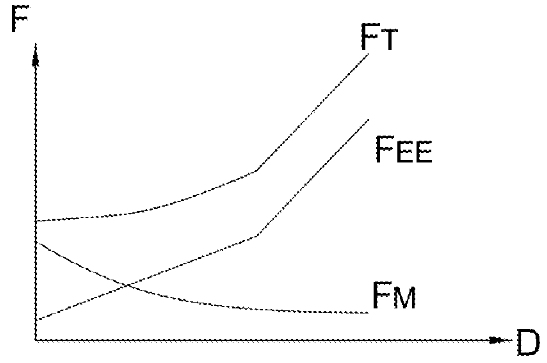
FIG. 9C shows a diagram similar to the diagram shown in FIG. 9B, where the elastic element comprises two different elastic stages, a first low-rigidity elastic stage and a second high-rigidity elastic stage.

As shown in FIGS. 9B and 9C, the magnetic force ($F_M$) created by the electronic means on the movable part (13) is reduced as said movable part (13) moves from the closed-end position to the open-end position, since the force of attraction is reduced the further away the piece to be attracted is; however, this decrease is offset by the increase in the force of the elastic element ($F_{EE}$).

If the main valve (17) has been arranged in the regulating chamber (14), the magnetic force ($F_M$) created on this movable part (13) is applied to the main valve (17), given that this main valve (17) is the upper support of the movable part (13). This force can be applied to the outer diameter of the valve, but also to any other diameter if desired.

If necessary, controlled channels can be provided to ensure the correct lubrication of the movable elements present in the shock absorber (9), as well as the discharge of gas that may flow to this area, towards the expansion chamber (25).

Figure 5:
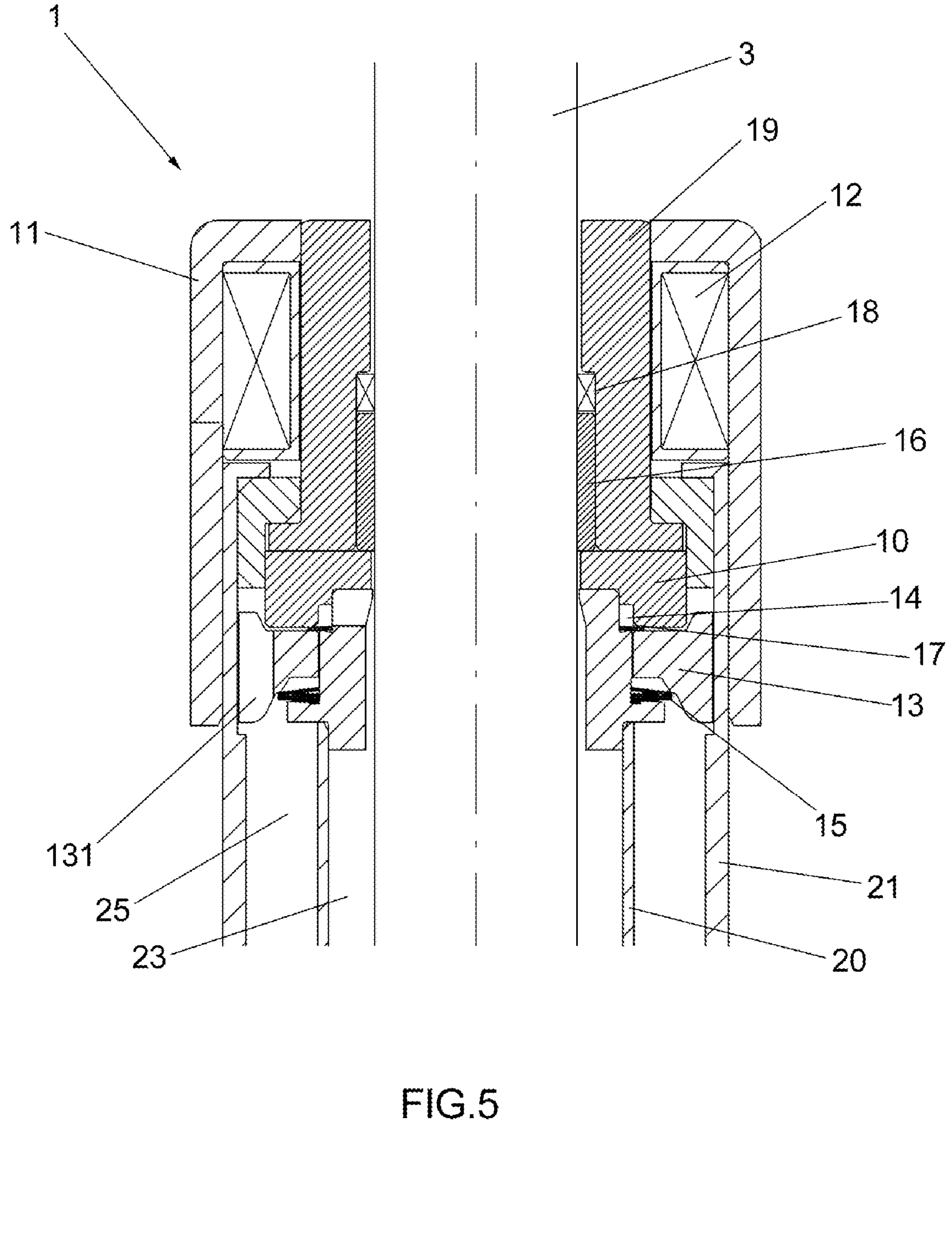
FIG. 5 shows a detailed view of the solenoid valve as shown in FIG. 1C, where the elastic element has variable rigidity since it comprises a stack of valves with an opening limiting valve.

As shown in FIG. 5, and unlike FIGS. 4A-4C, the elastic element (15) can comprise two or more different elastic stages, a first low-rigidity elastic stage and a second high-rigidity elastic stage. Given this configuration, a low rigidity can be available for small openings, but its rigidity can be increased for larger openings. Thus, when the system has large openings, there is a greater force that tends to close the solenoid valve (1), which may be suitable for preventing the appearance of vibrations from certain operating speeds of the shock absorber (9) that cause undesired large openings of the solenoid valve (1).

Figure 7:
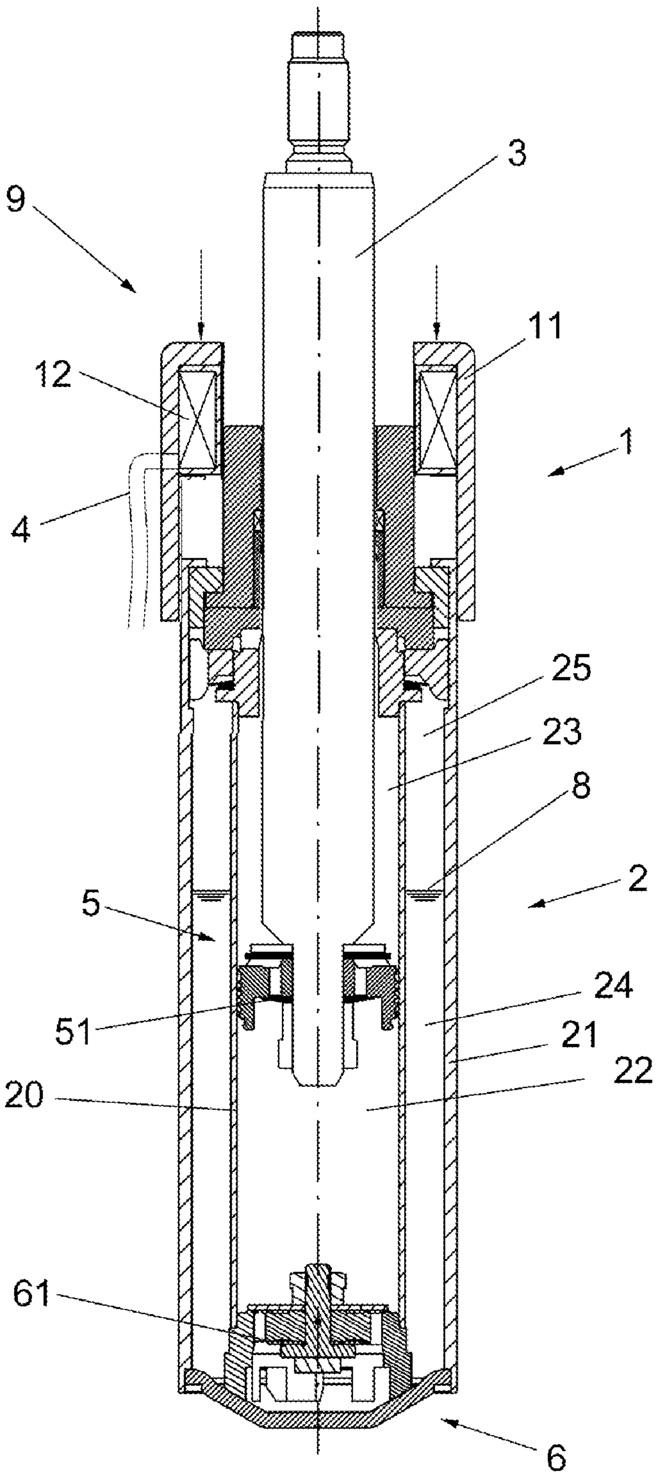
FIG. 7 shows a view of the shock absorber, where the modular element, which comprises the cover with the electronic means, which in turn comprise a coil, is partially assembled with the rest of the components of the solenoid valve, showing its modular nature.

FIG. 7 shows that the solenoid valve (1) can comprise a modular configuration, where the cover (11) together with the electronic means comprise a module that can be assembled to the body (2) of the shock absorber (9), where the rest of components of the solenoid valve (1) are already assembled. This configuration facilitates the configuration of the solenoid valve (1) to prevent the electronic means from coming into contact with damping or lubrication fluids that could damage its state or hinder its operation.

Figure 8:
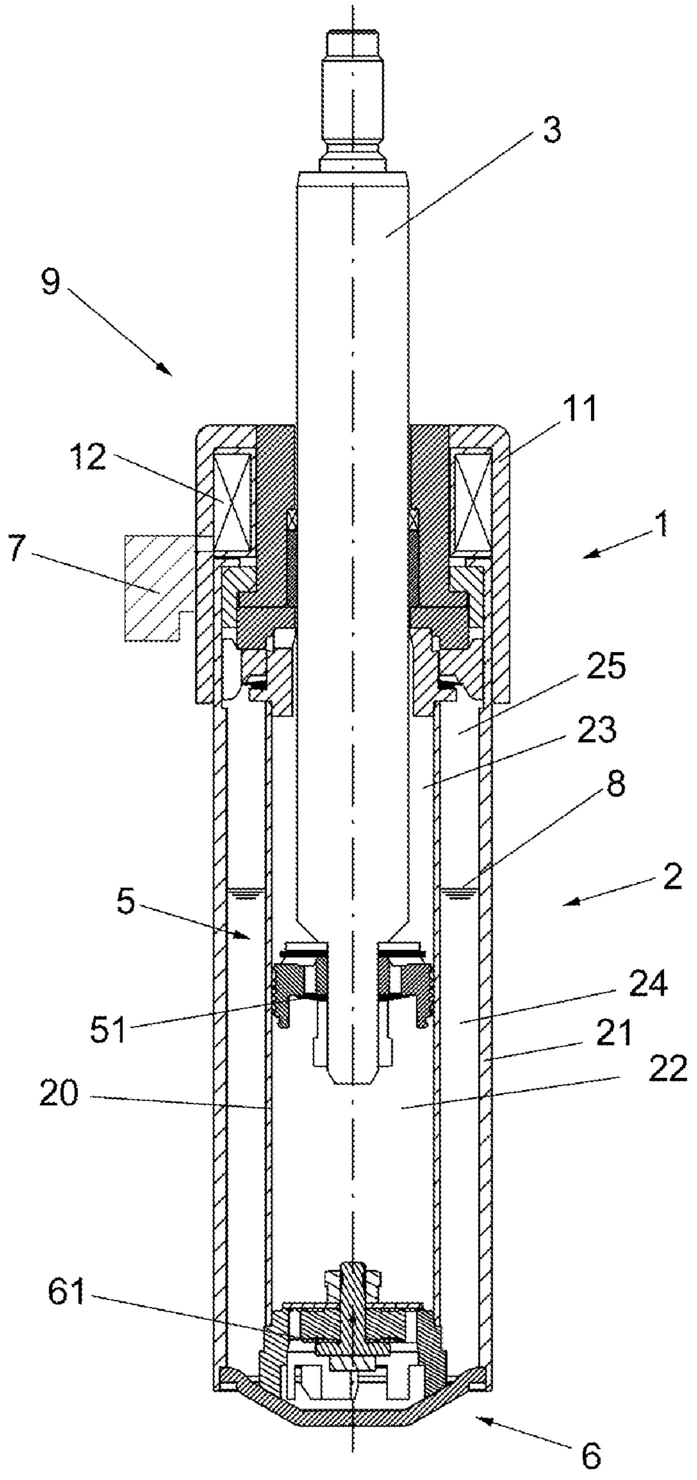
FIG. 8 shows a view of the shock absorber similar to that shown in FIG. 7, where the modular element is fully inserted into the rest of the components of the solenoid valve but comprising a connector fixed on the cover instead of a wired connection, connected to the coil of the electronic means.

As indicated and as shown in FIG. 7, the cover (11) is joined to a wired connection (4) which is connected to the electronic means, said wired connection (4) being configured to connect, electronically, to the control means of the solenoid valve (1). However, in a different embodiment, as shown in FIG. 8, the cover (11) may comprise a connector (7) fixed on the cover (11) instead of a wired connection (4), also connected to the coil (12) of the electronic means. This connector (7) can allow for a wireless connection of the shock absorber (9) with the control system.

Figure 6:
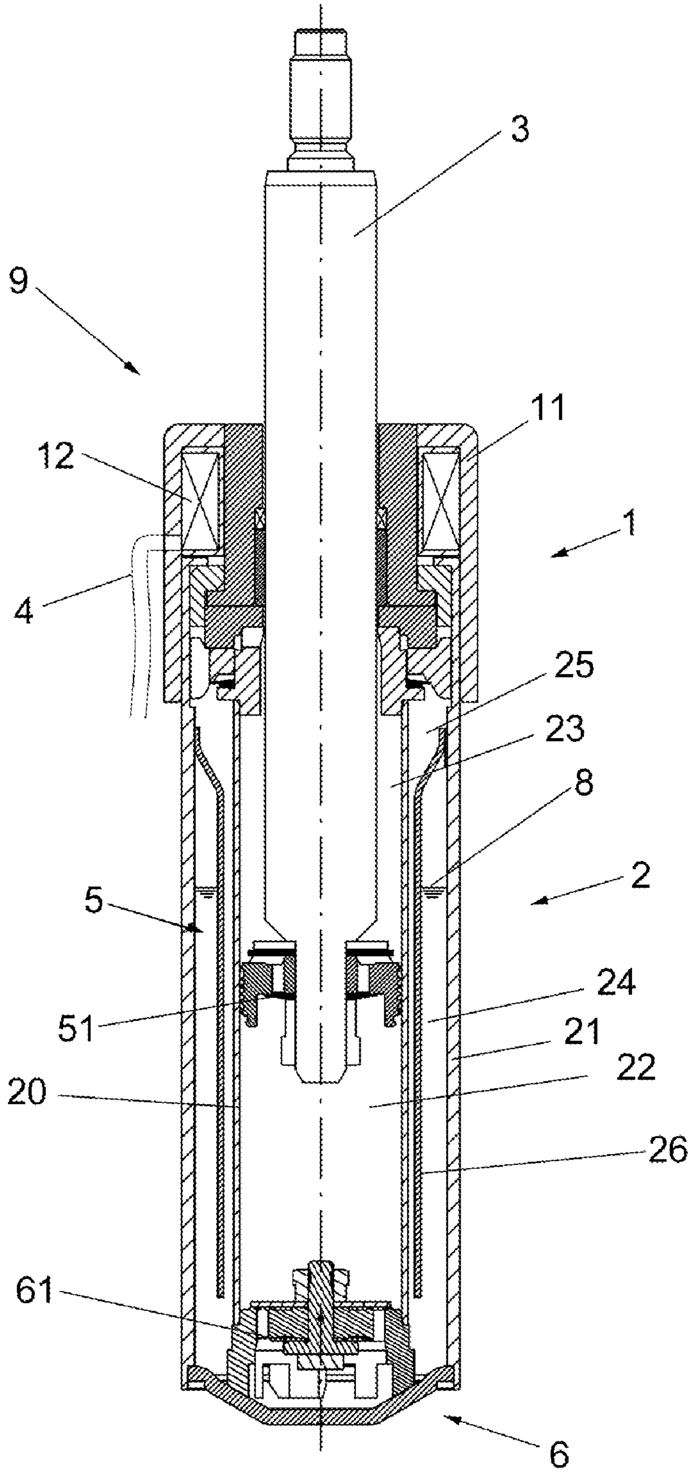
FIG. 6 shows the same view of the shock absorber shown in FIG. 1A, which comprises an intermediate tube between the inner tube and the outer tube, which allows the fluid of the shock absorber to be directed from the regulating chamber of the solenoid valve to a lower portion of the reserve chamber.

In another embodiment, as shown in FIG. 6, the shock absorber (9) may comprise an intermediate tube (26) located between the inner tube (20) and the outer tube (21), to direct the fluid (8) to the reserve chamber (24) so that said fluid (8) is prevented from circulating through the expansion chamber (25) (which is full of gas), thus preventing an unwanted mixture of air and oil, which can cause foaming.

In another non-preferred embodiment, the shock absorber (9) may comprise a complementary solenoid valve (29) adjusted, hermetically, to a second end of the body (2) of the shock absorber (9), in addition to the solenoid valve (1) connected to the first end, as shown in FIG. 1B. So that the passage of fluid (8) through both ends of the fluid is regulated at all times.

Operation of the Shock Absorber with a Solenoid Valve

When the shock absorber (9) begins an extension movement (E), the fluid (8) (oil) in the upper chamber (23) is compressed, increasing its pressure. Since the volume of the upper chamber (23) decreases, the fluid (8) must exit said chamber. If the pressure is lower than the opening pressure of the solenoid valve (1), said valve is closed; therefore, the fluid (8) will flow through the piston subassembly (5) and pass through the controlled leak that has been configured in said piston subassembly (5), in that of the solenoid valve (1), or through both.

Thus, by means of the fixed configuration of the leak of the piston subassembly (5) and/or of the solenoid valve (1), a series of pressure drops are created in the upper chamber (23), since the fluid (8) passes through the aforementioned hydraulic ducts. The pressure resulting from the fluid (8) in said chamber, different from the pressure in the lower chamber (22), each applied to its corresponding face of the piston, creates the load of the shock absorber.

In this way, the hydraulic load of the shock absorber (9) is defined at low movement speeds of the rod (3) in extension (E), since the low speeds create pressures lower than the opening pressure of the solenoid valve (1). This type of control at low speeds of the rod (3) is used to improve the stability of the vehicle.

For faster movement speeds of the rod (3), the pressure continues to increase until reaching the opening pressure of the solenoid valve (1). When the pressure existing in the regulating chamber (14) is high enough to overcome the forces that close the movable part (13) on said chamber, this movable part (13) moves so that the solenoid valve (1) remains open, establishing a flow of fluid (8) that comes from the upper chamber (23) and ends in the reserve chamber (24), after passing through the expansion chamber (25).

Since the opening pressure of the solenoid valve (1) is regulated through the magnetic force ($F_M$) created on the movable part (13), the pressure level from which the fluid (8) is allowed to flow through the open solenoid valve (1) is controlled, thus controlling the pressure in the upper chamber (23), thus generating the load of the shock absorber.

By advantageously using the existing space system, such as the coil (12) having been arranged in the area of the shock absorber guide, a magnetic force large enough to be able to directly handle the pressure existing in the regulating chamber (14) is obtained, without having to have an amplification stage, as is common in other types of systems that offer continuous regulation of the hydraulic load.

When the solenoid valve (1) opens, the movable part (13) slides and increases its distance with respect to the disc (10), so that according to the laws of magnetism, the magnetic force ($F_M$) that the movable part (13) undergoes decreases. This drop in force is offset by the elastic element (15) located on the lower face of the movable part (13), so that when said part lowers, said elastic element (15) is pressed, creating force and stabilising the movable part (13).

FIG. 9B shows an example of the total force that the movable part (13) undergoes depending on its opening, where said total force ($F_T$) equals the sum of the magnetic force ($F_M$) plus the force exerted by the elastic element ($F_{EE}$). The resulting curve of total force ($F_T$) can be configured from the other two forces, so that it has the desired shape, which is important to determine the hydraulic behaviour of the shock absorber (9).

An advantageous arrangement, shown in FIG. 9C, can be a rigidity of the elastic element (15) in two stages, so that the rigidity is low for small openings, but its rigidity is increased for larger openings, so that when the system has large openings, there is a greater force that tends to close the solenoid valve (1), which may be suitable for preventing the appearance of vibrations from certain operating speeds of the shock absorber that cause large openings of the solenoid valve.

In a compression movement of the shock absorber (9), the operation is very similar to that of opening or extension, with the fluid (8) passing through the piston subassembly (5) and through the valve support subassembly (6). In this way, when moving at low speeds, the solenoid valve (1) does not open, but at higher speeds, a sufficiently high pressure is generated in the regulating chamber (14) to move the movable part (13) towards the open-end position.

The invention claimed is:

1. A solenoid valve for shock absorber with hydraulic load regulation, wherein the solenoid valve is configured to:

be adjustable axially and hermetically, to a first end of a body of a shock absorber; and regulate the hydraulic load of a fluid that flows through the inside of the shock absorber;

wherein the solenoid valve comprises a longitudinal hole, configured to guide and seal, in a longitudinal movement, a rod comprised in the shock absorber, wherein the solenoid valve comprises:

a movable part that can be moved between a closed-end position and an open-end position;

a regulating chamber configured to receive and release fluid from the body of the shock absorber; and an elastic element configured to exert a load to move the movable part, in the direction of movement, in the direction of the open-end position towards the closed-end position of the movable part, wherein the regulating chamber is configured to increase an internal pressure upon receiving fluid from the body and transmit a force created by the internal pressure to the movable part, wherein the movable part is configured to move from the closed-end position towards the open-end position upon receiving a specific pressure from the regulating chamber, where such movement places the movable part in infinite intermediate positions between both ends, when the chamber raises the internal pressure, wherein the regulating chamber is configured to release fluid when the movable part has moved from the closed-end position to the open-end position, and wherein the solenoid valve comprises electronic means configured to exert a force to move the movable part in the direction of movement, upon receiving a control electric current.

2. The solenoid valve according to claim 1, wherein the movable part comprises one or more hydraulic duct configured to direct the passage of fluid released by the regulating chamber, through an expansion chamber, towards a reserve chamber of the body of the shock absorber.

3. The solenoid valve according to claim 2, wherein the solenoid valve comprises a controlled fluid leak that connects the regulating chamber to the expansion chamber.

4. The solenoid valve according to claim 1, further comprising a low-friction bushing arranged inside the solenoid valve, adjustable with clearance on the rod of the shock absorber, wherein the low-friction bushing is configured to guide the longitudinal movement of the rod.

5. The solenoid valve according to claim 1, further comprising a hydraulic seal arranged inside the solenoid valve, adjustable on the rod of the shock absorber, configured to hermetically seal the shock absorber.

6. The solenoid valve according to claim 1, further comprising a connection bushing configured to be assembled to a longitudinal inner tube of the damping body, the connection bushing being adjusted with clearance to the rod of the shock absorber, wherein the adjustment with clearance between the connection bushing and the rod comprises a duct for passage of fluid from the inner tube to the regulating chamber.

7. The solenoid valve according to claim 6, further comprising a sealing element between the movable part and the connection bushing, the sealing element configured to prevent leaks of fluid from the regulating chamber.

8. The solenoid valve according to claim 6, further comprising a disc, adjustable with clearance to the rod of the shock absorber, wherein the disc is assembled to the connection bushing, and wherein the disc acts as a stop for the movable part in the closed-end position.

9. The solenoid valve according to claim 1, wherein the regulating chamber comprises an annular geometry concentric to the rod of the shock absorber to which the solenoid valve can be adjusted.

10. The solenoid valve according to claim 8, wherein the annular geometry of the regulating chamber is delimited by the movable part, the connection bushing and the disc.

11. The solenoid valve according to claim 1, wherein, with the solenoid valve being connected to the body of the shock absorber, the movable part is located blocking the expansion chamber of the shock absorber by a surface opposite a surface that is in contact with the regulating chamber.

12. The solenoid valve according to claim 1, further comprising a main valve, located adjacent to the regulating chamber, the main valve configured to transmit the force created by the pressure of the regulating chamber to the movable part, wherein the main valve comprises a portion subjected to the pressure of the regulating chamber, which can be regulated.

13. The solenoid valve according to claim 1, wherein the electronic means comprise a coil configured to generate a magnetomotive force that creates a magnetic flux when the coil receives a control current, wherein the flux is configured to generate a load to move the movable part between the open-end position and the closed-end position, and wherein the movable part comprises a ferromagnetic material.

14. The solenoid valve according to claim 1, further comprising a rod guide that comprises a hole which comprises a section larger than the section of the rod of the shock absorber to which the solenoid valve can be connected, wherein the hole is arranged concentrically to the longitudinal path of the rod when the solenoid valve is connected to the body of the shock absorber.

15. The solenoid valve according to claim 8, wherein the rod guide, the movable part and the disc each comprise a ferromagnetic material, and wherein the solenoid valve comprises a functional magnetic circuit that comprises an assembly formed by the coil, the rod guide, the movable part and the disc, the functional magnetic circuit being configured to exert a force on the movable part and control the movement of the movable part between the closed-end position and the open-end position.

16. The solenoid valve according to claim 1, wherein the elastic element comprises two or more different elastic stages, a first low-rigidity elastic stage and a second high-rigidity elastic stage.

17. The solenoid valve according to claim 1, wherein the elastic element comprises an element selected from: a disc valve, a plurality of stacked disc valves, a helical spring, a wave spring, a disc spring, or a combination of the foregoing.

18. The solenoid valve according to claim 1, further comprising a modular element that comprises a cover joined to the electronic means, wherein the modular element can be assembled to the rest of the assembled components comprised in the solenoid valve, by means of a removable mechanical joint.

19. The solenoid valve according to claim 1, wherein the modular element comprises a wired connection connected to the coil, and wherein the wired connection is configured to electronically connect to the control means of the solenoid valve.

20. A shock absorber with hydraulic load regulation, comprising a solenoid valve, as defined in claim 1, adjusted axially, and hermetically to a first end of a body comprised in the shock absorber, wherein the shock absorber comprises a rod that can be moved longitudinally inside the body, the rod passing through the longitudinal hole of the solenoid valve.

21. The shock absorber according to claim 20, wherein the rod comprises a piston subassembly connected to a lower end portion of the rod, wherein the piston subassembly is located inside the body, sharing longitudinal movement with the rod, and wherein the piston subassembly comprises one or more assembled piston valves that comprise configurable rigidity and pre-deformation.

22. The shock absorber according to the claim 21, wherein the piston subassembly comprises a controlled permanent leak.

23. The shock absorber according to claim 21, wherein the body of the shock absorber comprises:

an inner tube assembled, by an upper end portion of the inner tube, to the solenoid valve, the inner tube configured to house the rod during its longitudinal movement; and an outer tube assembled, by an upper end portion of the outer tube, to the solenoid valve, the inner tube being located inside the outer tube, wherein the inner tube comprises a lower chamber located between a lower end portion of the inner tube and the piston subassembly of the rod, and an upper chamber located between the piston subassembly of the rod and the solenoid valve, wherein the shock absorber comprises a reserve chamber and an expansion chamber located between the inner tube and the outer tube, and wherein the solenoid valve is configured to limit the passage of fluid of the shock absorber between the chambers of the inner tube to the chambers of the outer tube.

24. The shock absorber according to claim 23, further comprising an intermediate tube located between the inner tube and the outer tube, the intermediate tube configured to direct the fluid of the shock absorber from the solenoid valve to a lower portion of the reserve chamber.

25. The shock absorber according to claim 20, further comprising a valve support subassembly adjusted hermetically, to a second end of the body, wherein the valve support subassembly comprises one or more assembled support valves that comprise configurable rigidity and pre-deformation.

26. The shock absorber according to claim 20, further comprising a complementary solenoid valve adjusted hermetically to a second end of the body comprised in the shock absorber.

* * * * *